US012786309B2

(12) United States Patent
Rose et al.

(10) Patent No.: US 12,786,309 B2
(45) Date of Patent: Nov. 3, 2026

(54) NOTIFICATION FILTERING USING MACHINE LEARNING MODELS

(71) Applicant: Nvidia Corporation, Santa Clara, CA (US)

(72) Inventors: Amy Rose, Chapel Hill, NC (US); Andrew James Woodard, Buckinghamshire (GB); Benjemin Thomas Waine, Cheshunt (GB)

(73) Assignee: Nvidia Corporation, Santa Clara, CA (US)

( * ) Notice: Subject to any disclaimer, the term of this patent is extended or adjusted under 35 U.S.C. 154(b) by 221 days.

(21) Appl. No.: 18/734,149

(22) Filed: Jun. 5, 2024

(65) Prior Publication Data

US 2025/0379934 A1 Dec. 11, 2025

(51) Int. Cl.
*H04M 1/72454* (2021.01)
*H04M 1/72457* (2021.01)
*H04M 1/72484* (2021.01)

(52) U.S. Cl.
CPC ... *H04M 1/72454* (2021.01); *H04M 1/72457* (2021.01); *H04M 1/72484* (2021.01)

(58) Field of Classification Search
CPC ......... H04M 1/72454; H04M 1/72457; H04M 1/72484
USPC .......................................................... 455/414.1
See application file for complete search history.

(56) References Cited

U.S. PATENT DOCUMENTS 9,075,435 B1 * 7/2015 Noble ..................... G06F 3/167
9,891,800 B2 * 2/2018 Prakash .............. H04M 1/7243
10,200,237 B1 * 2/2019 Gupta ................... H04L 67/306
10,515,081 B2 * 12/2019 Birchall et al. ... G06F 16/24578
2017/0118162 A1 * 4/2017 Ratiu .................... H04L 51/214
2019/0007546 A1 * 1/2019 Anderson ......... H04M 1/72454
2019/0140892 A1 * 5/2019 Jain ......................... H04L 41/16
2019/0235936 A1 * 8/2019 Murdock et al. ............................ G06F 16/24578
2021/0250727 A1 * 8/2021 Lei .................... H04M 1/72457
2021/0342740 A1 * 11/2021 Xu et al. ............. G06F 16/9535
2023/0049885 A1 * 2/2023 Bakshi .................. H04L 51/222
(Continued)

FOREIGN PATENT DOCUMENTS

WO WO-2017193515 A1 * 11/2017 .......... H04W 68/005
WO WO-2018176807 A1 * 10/2018 .............. H04M 1/67

*Primary Examiner* — Mahendra R Patel
(74) *Attorney, Agent, or Firm* — Hogan Lovells Cadwalader US LLP

(57) ABSTRACT

Approaches of the disclosure are directed towards the intelligent management of notifications. Notifications can be intelligently managed across digital devices by contextualizing and prioritizing notifications to, for example, match a current state or situation of a user. Incoming notifications may be contextualized by analyzing their content and sources, such as by using large language models. Such an approach may further take into account the user's current status, including factors such as location, activity, and personal preferences, as may be obtained from various sources or learned over time. Preferences or appropriate delivery methods can be learned by observing and/or analyzing user interactions associated with previously-presented notifications and adjusting the delivery methods for subsequent notifications, which may involve suppressing the notification, presenting immediately, changing an alert type, or altering content for presentation.

15 Claims, 19 Drawing Sheets

(56) References Cited

U.S. PATENT DOCUMENTS

| | | | | |
|---|---|---|---|---|
| 2023/0177941 | A1 * | 6/2023 | Roberts ................ | A61B 5/0022<br>340/539.11 |
| 2024/0348713 | A1 * | 10/2024 | Agrawal ........... | H04M 1/72484 |

* cited by examiner

600

NOTIFICATION FILTERING USING MACHINE LEARNING MODELS

BACKGROUND

In today's world, individuals receive a vast array of notifications from a variety of applications and devices. The notifications, ranging from emails and social media updates to work-related messages, present a challenge in maintaining focus and efficient time management. Existing implementations for notification management may include options to silence all alerts or silence alerts from specific applications. These methods lack the sophistication to analyze and prioritize notifications based on the user's context, activity, or the urgency of the information. As a result, users are forced to adopt an all-or-nothing approach-either facing the incessant flow of notifications or missing out on potentially important alerts by silencing them indiscriminately.

BRIEF DESCRIPTION OF THE DRAWINGS

Various embodiments in accordance with the present disclosure will be described with reference to the drawings, in which.

DETAILED DESCRIPTION

Figure 1A:
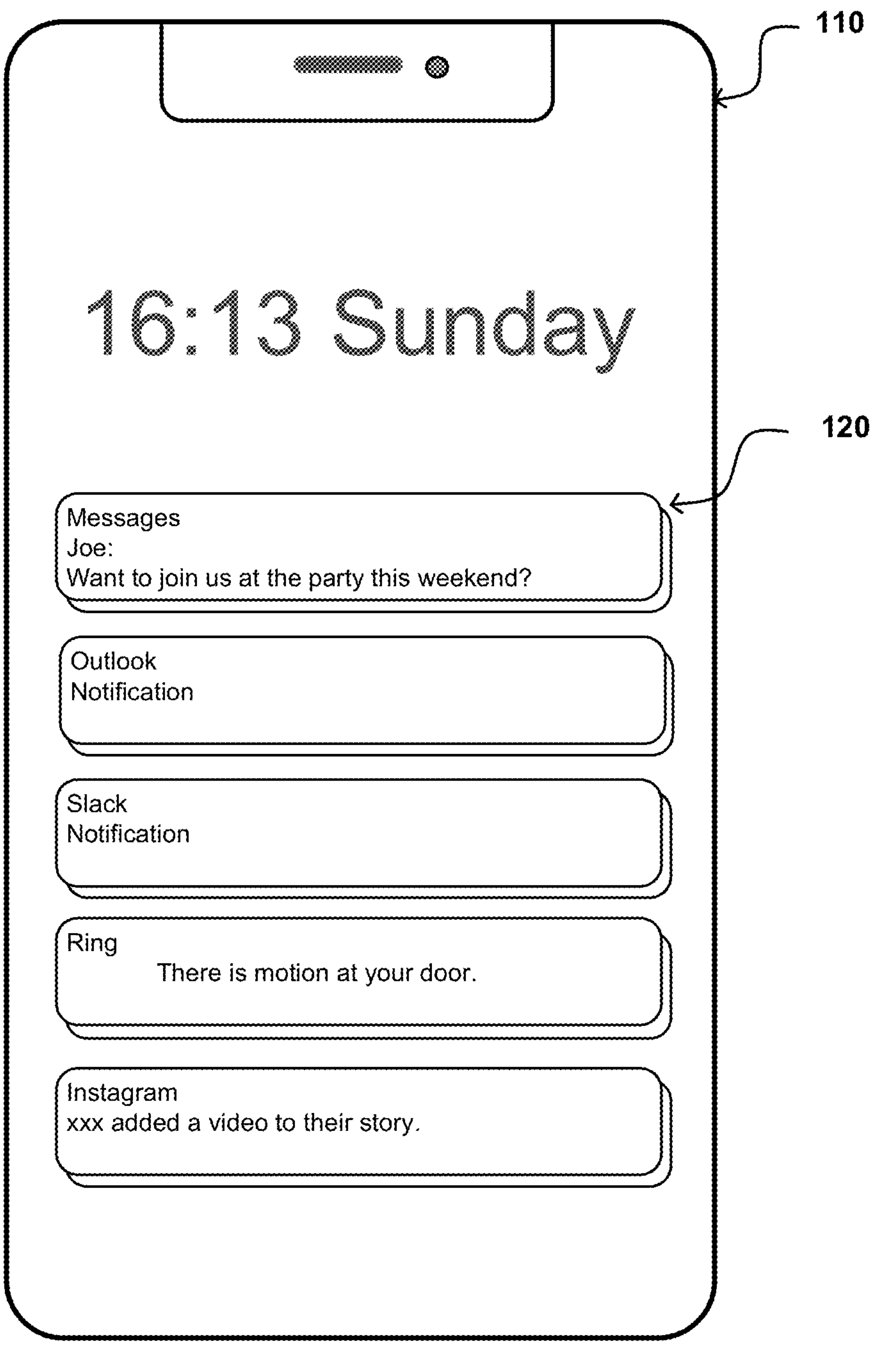
FIGS. 1A, 1B, 1C illustrate multiple example scenarios where an intelligent notification management system can be applied for notification filtering, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various embodiments of the disclosure are directed towards intelligent management of notifications. For example, notification management systems and methods in accordance with at least one embodiment can manage notifications across digital devices by employing a two-stage process—involving both contextualizing and scheduling—that can effectively manage how, when, and whether to present specific notifications, such as may be based on a current context or to match a user's needs and situations. An example notification management system may first contextualize incoming notifications by, for example, analyzing information such as the notification content and sources using one or more large language models and/or filtering methods. Based in part on the contextual information, notifications can be categorized (or clustered, etc.) based on factors like urgency, relevance, and the type of information the notifications contain. Such a system may further take into account a user's current status, including factors such as location, activity, time of day, and personal preferences. Such user information may be obtained from various locations, such as a user's calendar, current application session or activity, recent log data, specified preferences, or learned preferences over time, among other such options. Such a system can learn from user interactions associated with previously presented notifications, for example, as well as the ways in which those notifications were presented, and adjust the delivery methods for subsequent notifications accordingly. Such an approach can include, for example, determining the appropriate delivery method for each notification, which may involve suppressing the notification, displaying it immediately, changing the alert type, determining a time to display the notification, determining not to display the notification, combining notifications, or altering the content for display, among other such options. The ways in which notifications are presented may also be adjusted based on factors such as a user's current situation or environment, etc. The user can take action with various read or unread notifications in various ways and/or at various times, as may be based on user preference.

Approaches in accordance with at least one embodiment may provide several technical advantages and improvements. For example, approaches to intelligent notification management may improve user experience by analyzing, categorizing, and determining appropriate methods to deliver notifications. Such a system can enhance the efficiency of notification processing by utilizing machine learning models to analyze both the content and context of incoming notifications. A notification management system may classify notifications into various categories such as critical alerts, work-related messages, personal updates, and non-urgent information. Some notifications may be presented immediately, while others may be delayed for another time and/or have their content modified. Any delayed or suppressed messages may then be determined to be delivered at a later time, such as may be based on one or more factors, such as a change in status of the user, user context, or environment. By taking into account user status information, such as the user's current activity, location, time of day, current physical and/or mental state, and their calendar events, for example, notifications that are most relevant and urgent at a current point in time or location can be prioritized. For instance, during work hours, an example notification management system may suppress personal notifications but highlight work-related alerts, especially those requiring immediate attention. Conversely, during off-work hours, personal messages may be prioritized while minimizing, delaying, or rewording work-related notifications. By intelligently determining delivery methods for different notifications based at least in part on a comprehensive understanding of the notifications and the user status, approaches in accordance with at least one embodiment may ensure that users receive the right information at the right time, therefore achieving improved time management.

Moreover, approaches in accordance with at least one embodiment may offer substantial improvements in customization and adaptability of notification management. Unlike static systems that require users to manually adjust settings for different applications, an intelligent notification management system may learn user preferences and changing contexts and dynamically adjust delivery methods for notifications. Machine learning techniques (such as large language models) may be used to understand user behaviors and preferences over time which allows for an increasingly personalized notification experience. For example, such a system may understand which notifications are acted upon and also how users react to them—whether they are dismissed immediately, interacted with, or left unattended. By analyzing these reactions in conjunction with the time, location, and content of the notifications, such a system may refine its understanding of user preferences. Consequently, corresponding delivery methods can be determined for future notifications based in part on this learned knowledge.

Additionally, approaches in accordance with at least one embodiment may enhance the accessibility of information by allowing users to easily refer back to notifications that were suppressed to ensure that no important alerts are missed. Unlike conventional systems where silencing notifications may potentially lead to losing track of them, an intelligent notification management system can store and categorize suppressed notifications for later review. This repository of notifications can be intelligently organized based on priority, context, or user-defined categories. Users may access any important information at a more suitable time or the suppressed notification may be determined to be displayed to a user device at a more suitable time to mitigate the risk of overlooking critical notifications during periods of high distraction.

Variations of this and other such functionality can be used as well within the scope of the various embodiments as would be apparent to one of ordinary skill in the art in light of the teachings and suggestions contained herein.

FIG. 1A illustrates a graphical user interface of a mobile device displaying multiple notifications from various applications. For example, the interface 110 illustrates notifications 120 from email applications, social media platforms, messaging applications, and professional tools. Each message may carry distinct contextual information. Traditionally, notification management systems offer users choices such as: to receive notifications in real-time or to use options like "Do Not Disturb" to mute them completely. Receiving notifications in real-time can lead to an overwhelming flood of notifications with a risk that important information may be missed or ignored amidst less critical alerts. Users may have the option to manually adjust settings for each application, but this process lacks personalization and often results in a suboptimal user experience. In certain scenarios, such as during vacations, users might prefer to be disturbed only by essential notifications, like urgent messages. In other scenarios, more intelligent contextualizing and prioritizing of notifications may be preferred. An intelligent notification management system provides a solution to the issues observed in traditional implementations. Such a system may utilize machine learning algorithms to intelligently determine a delivery method for notifications based on contextual information and the user's current status. For example, such a system may analyze the user's calendar to determine if they are on vacation or busy with work (e.g., in a meeting) and adjust notification delivery accordingly. In some embodiments, an intelligent notification management system may employ a machine learning model that learns from user reactions to various notifications over time and effectively decides suitable times and ways to deliver notifications. Such a system may allow for a more user-centric management of notifications which enhances overall user experience by ensuring that important information is highlighted while minimizing disruptions.

Figure 1B:
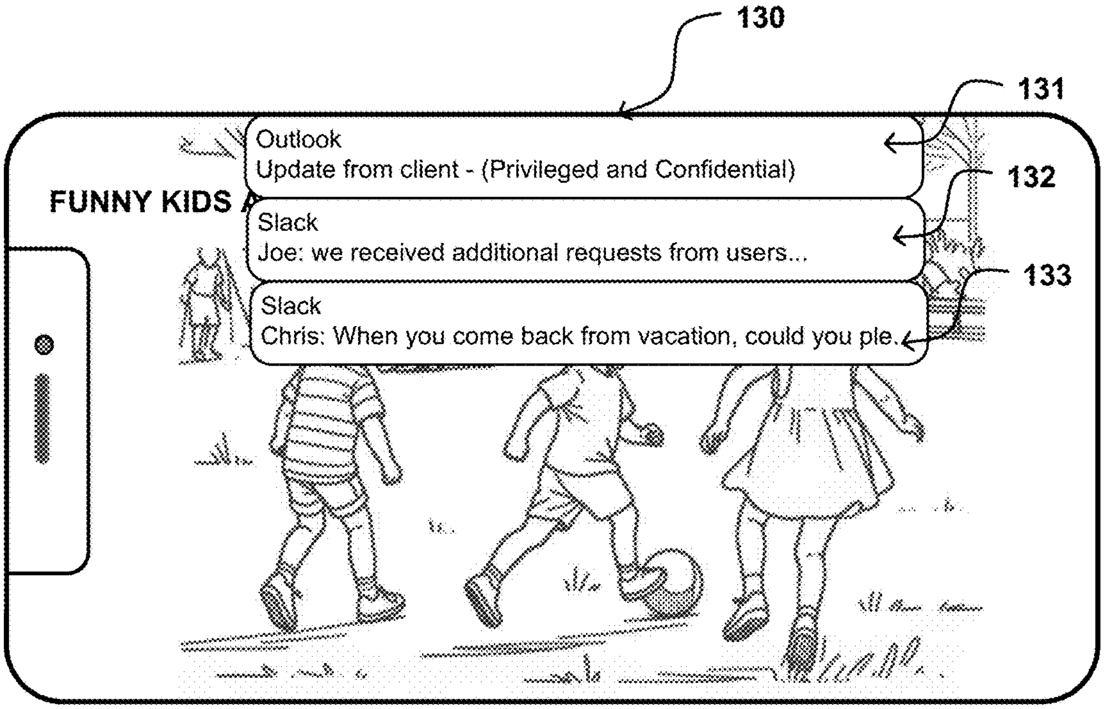
Figure 1C:
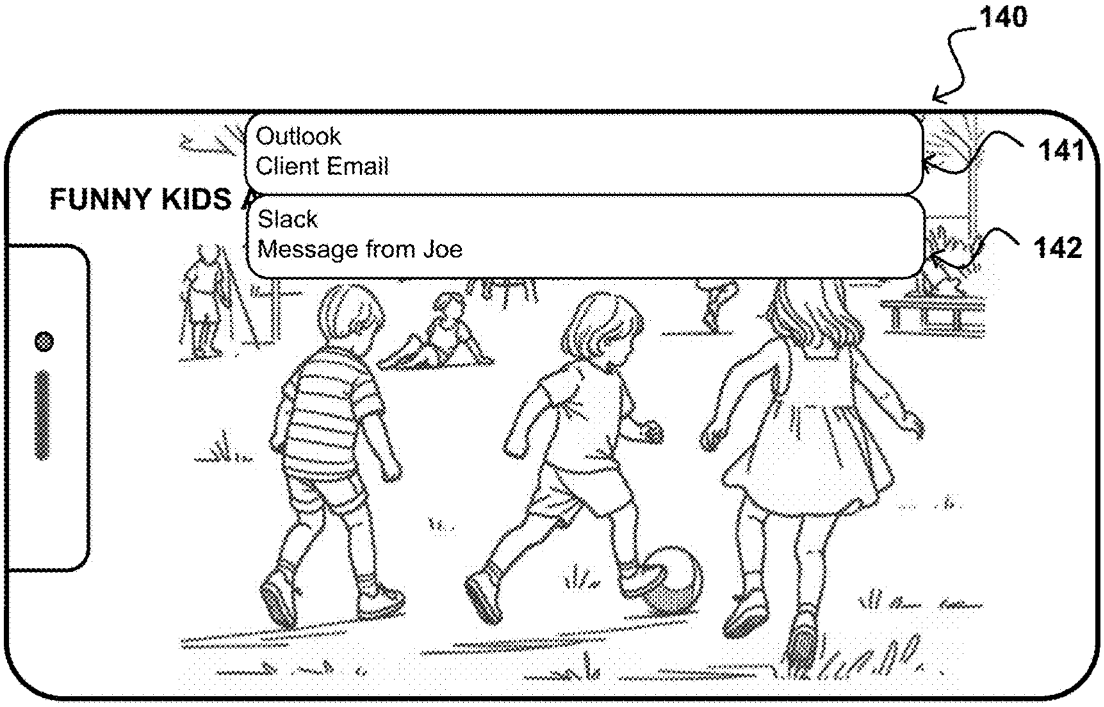

FIG. 1B illustrates another use case where an intelligent notification management system may be advantageous. Here, interface 130 is shown on a mobile device that, though owned by an adult, is currently being used by a child for leisure activities, such as watching kids' videos. In such a scenario, the device may still receive work-related notifications, like Outlook 131 and Slack messages 132, 133 containing sensitive content. These are displayed without consideration for the current user, who is not the intended recipient. In FIG. 1C, an intelligent notification management system may be used to address this issue. The interface 140 exemplifies an approach by adapting the notification delivery to the user's context. Recognizing that the device is in use for children's entertainment or that the user is off-work, an intelligent notification management system may redact sensitive information from the displayed notifications or replace them with a nondescript summary, which ensures that confidential content is not inadvertently exposed to unintended viewers, such as children. For example, sensitive information in messages 131 and 132 is replaced with a nondescript summary as illustrated in messages 141 and 142. Alternatively, such an intelligent system may determine delivery methods for these notifications by scheduling these notifications to reappear during the adult user's identified working hours. For example, the Slack message 133, which includes work-related content, may be rescheduled to be delivered when the user is determined to be back to work hours. This way, an intelligent notification management system not only protects sensitive information from being displayed at inappropriate times but also supports the user's work-life balance by adjusting delivery methods for work-related notifications to times that correlate with the user's typical work schedule.

Figure 2:
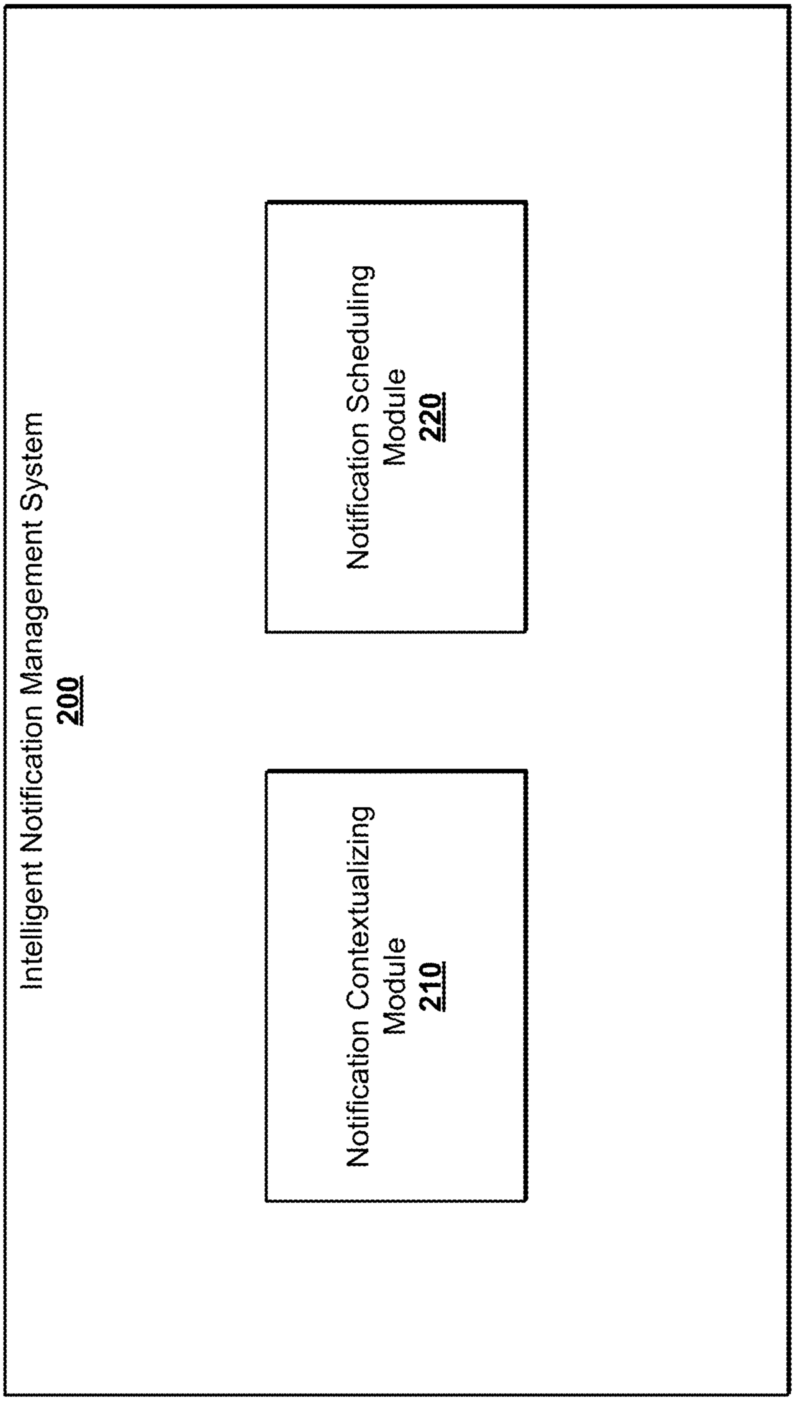
FIG. 2 is a block diagram that illustrates example components in an intelligent notification management system, according to at least one embodiment.

FIG. 2 illustrates an example intelligent notification management system 200 in accordance with at least one embodiment. The example diagram of the intelligent notification management system 200 may include components such as a notification contextualizing module 210 that analyzes semantic meaning of incoming notifications and a notification scheduling module 220 that applies rules, preferences, or learned behavior to deliver the notifications. Each module is discussed in further detail below.

A notification contextualizing module 210 may analyze and categorize incoming notifications across various platforms. For example, notifications may be received from email apps, social media, messaging apps, workplace messaging apps, phone calls, and other apps. Such a notification contextualizing module 210 may analyze and interpretate the notification content and categorize it accordingly. To achieve this, the notification contextualizing module 210 may employ a large language model for text-based notifications, such as (GPT—Generative Pre-trained Transformer or BERT—Bidirectional Encoder Representations from Transformers), to understand the semantics and the implied urgency of the messages. The notification contextualizing module 210 may also integrate other AI (Artificial Intelligence)-driven technologies or probabilistic models like Bayesian filters for keyword-based categorization or image recognition for notifications associated with media platforms. For example, when a notification from a workplace messaging app like Slack is received, the notification contextualizing module 210 may analyze the content of the message, such as whether the message is a direct message mentioning the user, or a general channel update. The notification contextualizing module 210 may then assign metadata tags such as "work," "direct communication," or "low priority channel message." Similarly, for an email notification, the notification contextualizing module 210 may parse the sender information and subject line. If permitted by the user, the notification contextualizing module 210 may analyze the content of the email to determine if it is a high-priority work email, a promotional email, or a personal message. The notification contextualizing module 210 may assign labels or tags to each notification, where the labels may include: "work," "personal," "social," "news," "entertainment," "urgent," "non-urgent," "direct communication," "high-priority," "medium-priority," "low-priority," "action required," "for information only," "response needed," "family," "friends," "coworkers," "immediate attention," "due today," "due this week," "no deadline," "confidential," "private," or "public."

In one embodiment, a notification contextualizing module 210 may allow users to configure the level of analysis performed on notifications. For example, users may have the option to select the level of detail the notification contextualizing module 210 examines within each notification. As an example, a user may configure to only analyze sender information and subject lines for emails, rather than scanning the full body of the message. Such a feature may ensure that users maintain control over their privacy and the notification contextualizing module 210 only accesses the amount of information the user is comfortable with. In one embodiment, the notification contextualizing module 210 may offer tiered privacy modes such as: only accessing notification headers and sender information, analyzing notification headers, sender information, and the first line of the message body, or analyzing the entire content of the notification including the full message body and attached media. By providing these options, users can tailor the notification management system to fit their individual needs and comfort levels.

A notification scheduling module 220 may determine timing and method of notification delivery based on the contextual information provided by the notification contextualizing module 210. In one embodiment, a notification scheduling module 220 may use heuristic methods or machine learning models to learn from user interactions to determine a delivery method for notifications. An example notification scheduling module 220 is discussed in greater detail in accordance with FIG. 3.

Figure 3:
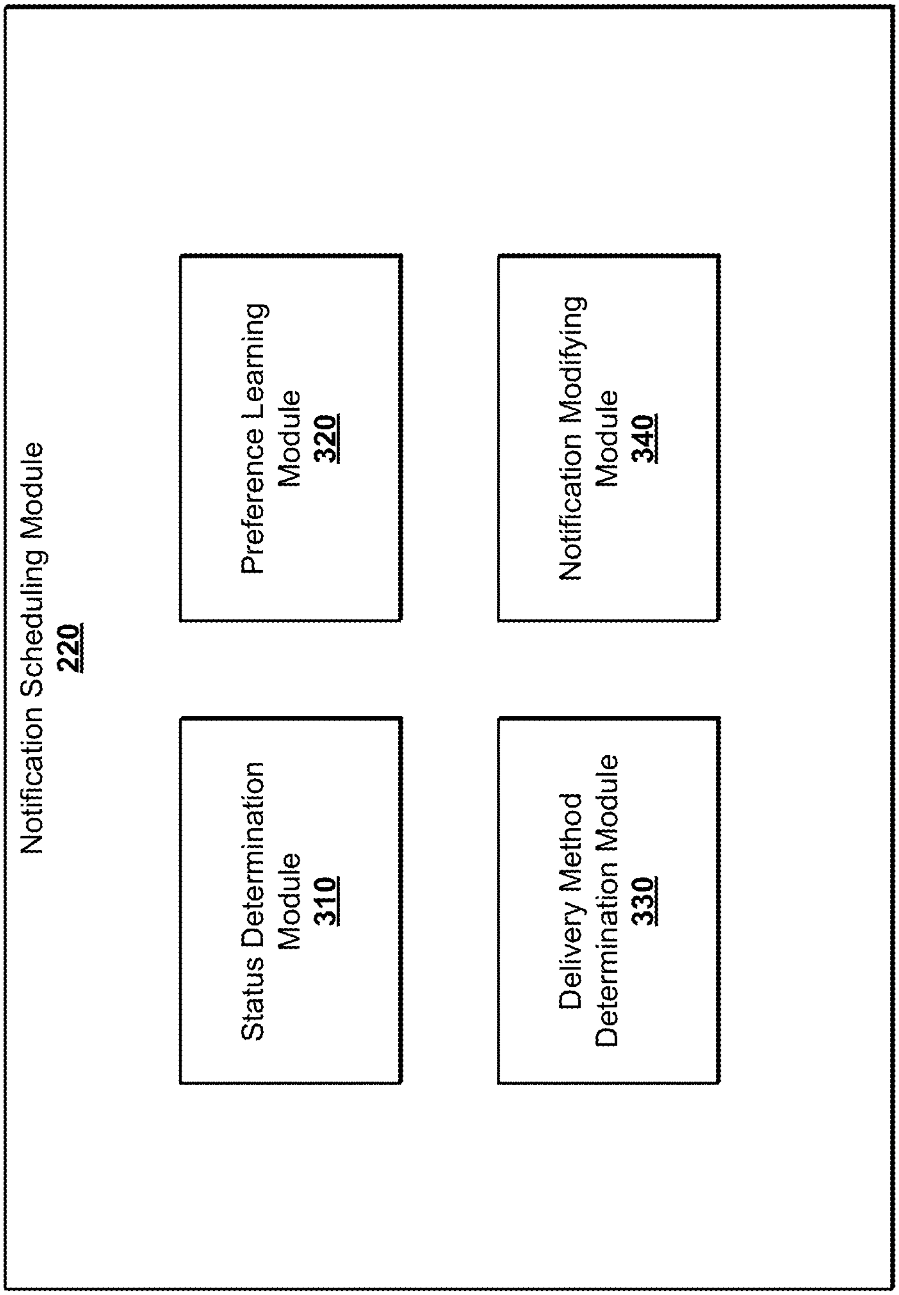
FIG. 3 is a block diagram that illustrates components in an example notification scheduling module, according to at least one embodiment.

FIG. 3 illustrates an example embodiment including example modules in a notification scheduling module 220. As illustrated in FIG. 3, a notification scheduling module 220 may include a status determination module 310 that determines a user status, a preference learning module 320 that learns patterns from user reactions, a delivery method determination module 330 that determines a delivery method for a notification, and a notification modifying module 340 that modifies notifications based on different scenarios. Each module is discussed in further details.

A status determination module 310 may gather information and assess a current status associated with the user. Such a status determination module 310 may interpret a variety of data inputs such as the user's calendar, location, activity level, time zone, and device usage patterns. For example, if the user's calendar indicates that they are in a meeting, the status determination module 310 may determine that the user is busy, which may trigger the system to hold non-urgent notifications. Alternatively, if the user is detected to be on vacation based on location data and calendar entries, the status determination module 310 may determine that the user is on vacation mode, which may trigger the system to only allow urgent personal messages in real time and determine alternative delivery methods for other notifications (such as sending at a different time when user status changes). In one embodiment, the status determination module 310 may be rule-based. The rules may be predefined and can assess certain conditions to determine user status. For example, if a calendar event is titled "meeting" and the current time falls within this event's timeframe, the heuristic rule would set the user's status to "busy" or "busy with work." In one embodiment, a status determination module 310 may also use corporate compliance and organizational rules/preferences as inputs. For example, adherence to regulations like the 2013 directive by the German Labor Ministry, which banned managers from contacting staff outside of work hours, can influence the scheduling and delivery of notifications. Such a status determination module may ensure that both personal preferences and legal or corporate policies are respected.

In one embodiment, a status determination module 310 may utilize machine learning models to analyze more complex and less structured data to identify patterns that may not be immediately apparent. For example, by examining device usage patterns, location data over time, and historical responsiveness to notifications, a status determination module 310 can predict when the user is likely in a work mode versus a leisure mode. Machine learning models can also adjust their predictions based on feedback, such as when a user manually changes their status or interacts with notifications differently than predicted. The machine learning models, for example, may take the following data as input: location data, GPS coordinates, location history, speed of movement, and proximity to known locations (e.g., home, office, gym), device usage patterns, screen on/off times, active state, idle state, specific app activity (e.g., using a fitness app might indicate exercise), sensor data, accelerometers (indicating movement), current time and day of the week, working hours, sleep times, user interaction with notifications, historical data on how the user has interacted with notifications in the past, such as which they dismissed quickly or interacted with, and at what times of day. The machine learning models may determine a tag or label for user status based on the input information.

A preference learning module 320 may learn from the user's past interactions with notifications to predict future preferences. Using machine learning algorithms, a preference learning module 320 may observe the user's behavior such as which notifications they dismiss immediately, which they interact with, and the times at which they prefer not to be disturbed. For example, the preference learning module 320 may learn that the user always dismisses social media notifications during work hours but engages with them after 6 PM. The preference learning module 320 may then suppress these notifications until the user is likely to find them relevant (e.g., send social media notifications after 6 PM). In one embodiment, the preference learning module 320 may learn which notifications are swiped away or tapped on and examines the duration of interaction. Notifications that are consistently dismissed quickly might be deemed less important, while those that lead to longer engagement are marked as high priority or interest. The preference learning module 320 may utilize front-facing camera technology and gaze detection algorithms to determine if the user actually looks at the notification and for how long. A quick glance might indicate mild interest or a decision to deal with it later, whereas not looking at a notification at all despite being active on the device could imply disinterest or inconvenience.

A preference learning module 320 may analyze not just whether interactions occur, but when they take place. For example, a pattern of engaging with certain types of notifications (like work emails) primarily in the morning hours and others (like gaming app alerts) in the evening hours can inform tailored delivery schedules. The preference learning module 320 may also learn silent times preference based on user's habits to identify preferred "do not disturb" periods. If a user consistently activates silent modes around the same times each day or week, the preference learning module 320 may anticipate these preferences to automatically enter a silent mode during these periods, adjusting for exceptions as user behavior changes. The preference learning module 320 may also examine the depth of interaction with the content of notifications. For example, opening a notification and spending time within the app or responding to a message indicates high engagement. This behavior signals the preference learning module 320 to prioritize similar notifications in the future. The preference learning module 320 may also determine preference based on notification response patterns by analyzing patterns in how users respond to notifications, such as quick replies to messages from certain contacts or applications.

A delivery method determination module 330 may determine the most suitable delivery method once a notification has been deemed appropriate for delivery based on the user's status and preferences. A delivery method determination module 330 may synthesize analyses from the preference learning module 320, the status determination module 310, and contextualizing module 210 to determine a personalized notification delivery strategy. The delivery method determination module 330 may intelligently decide how notifications should be presented to the user, considering their current status, historical preferences, and the context of their environment. For example, the delivery method determination module 330 may determine a delivery method such that the notification is less intrusive, such as changing an audible alert to a silent, visual notification when the user is in a meeting. In a driving scenario, delivery method determination 330 may hold all notifications except for critical alerts, which could be delivered via haptic feedback to minimize distraction. In at least one embodiment, a delivery method determination module 330 may assess user status and determine an appropriate time or schedule for sending notifications that are on hold. This determination is based on when it would be most suitable for the user to receive such notifications based on contextual information and user status.

A delivery method determination module 330 may determine a wide range of delivery methods that could be employed, depending on the insights gathered by the preference learning module 320, the status determination module 310, and the contextualizing module 210. The delivery method determination module 330 may determine a time for displaying a message using an approach. For example, when the user is busy, such as in a meeting, notifications can appear as small, non-intrusive pop-ups on the screen's edge. When the user is in a more relaxed state or has indicated a preference for more information, notifications can expand to show more content or action buttons. Based on the type of notification and the user's preference, different tones can be used to signal the importance or category of incoming alerts. The delivery method determination module 330 may adjust notification volumes based on ambient noise levels or silence them entirely during designated quiet times. In one embodiment, distinct vibration patterns can indicate different types of notifications or their urgency, useful when the user is in a situation where visual or auditory alerts are not practical, like driving or in a meeting. Instead of real-time alerts, notifications can be collected and presented as a summary at times the user typically takes breaks or checks their device. In one embodiment, the notifications can be grouped by category (e.g., work, social, news) and delivered in batches to minimize disruption and allow the user to focus on one type of information at a time. When the device detects a public setting or the presence of others, notifications can automatically switch to privacy modes, showing minimal detail until the user authenticates. Notifications relevant to the user's current location or activity (e.g., shopping list reminders when near a grocery store) can be prioritized and delivered promptly. In one embodiment, notifications can include quick action buttons (e.g., snooze, reply, delete) that allow users to interact without opening the app, based on the user's past interactions and preferences. Leveraging language models, the delivery method determination module 330 may offer suggested replies or actions for messages. For users with smartwatches or fitness bands, notifications deemed urgent or relevant to the user's current activity can be redirected to these devices for discreet viewing.

A notification modifying module 340 may modify the notification content itself to enhance privacy, readability, and appropriateness, based on the user's immediate context and preferred settings. For instance, if the user is in a public place or driving, the notification modifying module 340 may redact sensitive information from a work email or message preview for privacy. Additionally, the notification modifying module 340 may abbreviate or summarize notifications when the user is in a known busy state or convert text notifications to voice when the user is driving. In one embodiment, beyond redacting sensitive content in public or while driving, the notification modifying module 340 may use natural language processing models to identify and hide personal data (e.g., account numbers, addresses) or confidential information (e.g., project details) from notifications appearing on lock screens or wearable devices. When connected to a company network or identified through GPS as being in a sensitive location (e.g., a hospital), notifications can be automatically set to a higher privacy level, showing only sender information without previews. In one embodiment, the notification modifying module 340 may employ machine learning algorithms for text summarization, condensing long messages or emails into concise summaries, highlighting key points or actions required. In one embodiment, when driving, notifications may be converted into voice messages, read out through the car's speakers or Bluetooth headphones. By intelligently modifying notification content and delivery format, the notification modifying module 340 may ensure that notifications not only respect the user's privacy and current context but also enhance the overall experience by delivering information in the most accessible and preferable manner.

Figure 4:
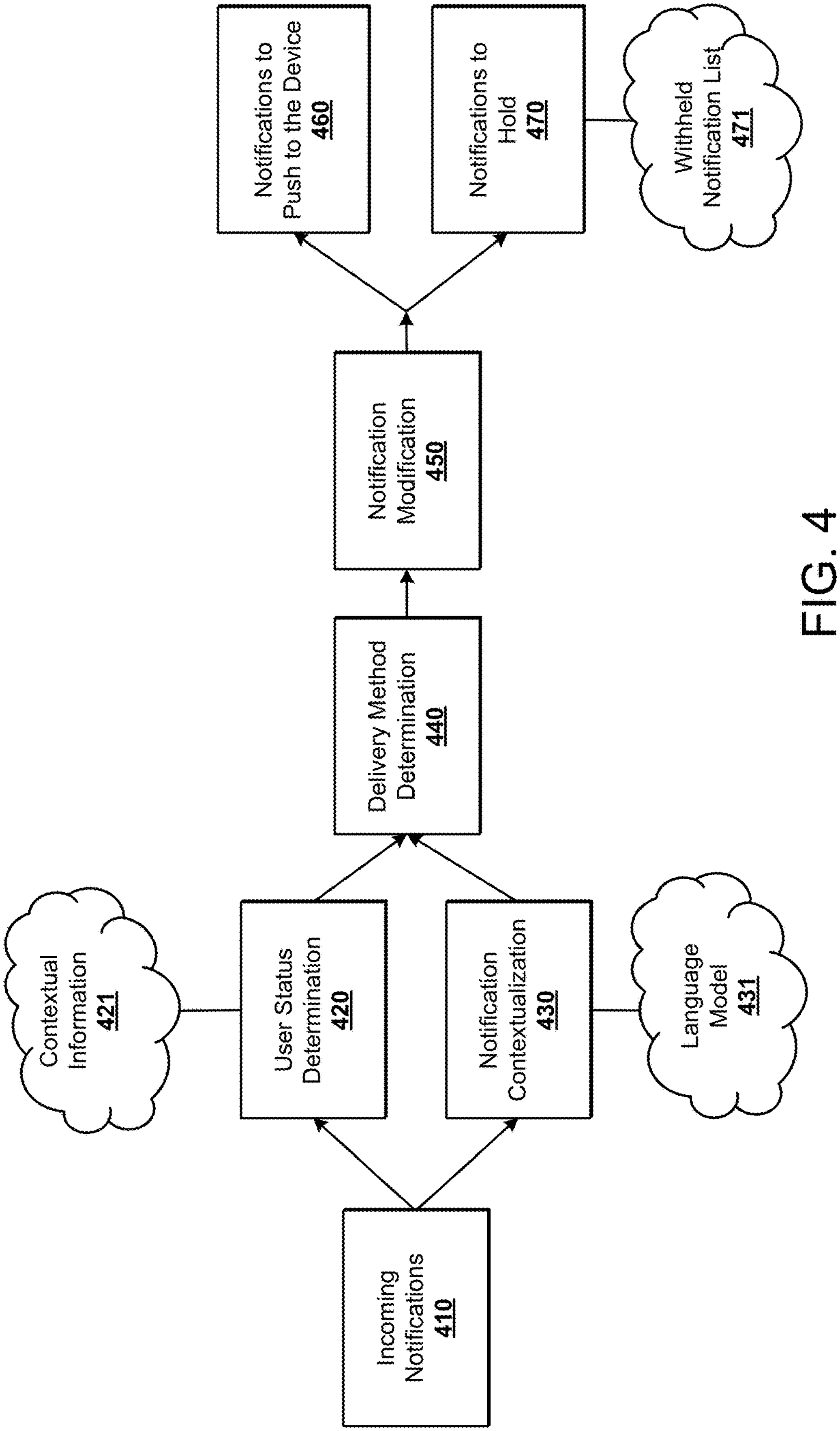
FIG. 4 illustrates an example process of processing incoming notifications using an intelligent notification management system, according to at least one embodiment.

FIG. 4 is a flow chart illustrating an approach that can be used to process incoming notifications 410 with the utmost relevance and discretion according to the user's context, preferences, and current status. A notification contextualization module 430 may first process incoming notifications 410 by analyzing the content of each notification using a language model 431. The notification contextualization module 430 may identify key characteristics such as the sender, subject matter, urgency, and whether the content is work-related or personal. A user status determination module 420 may evaluate the user's current context by drawing on contextual information 421 from a variety of sources like the user's calendar, location data, and activity sensors. A user status determination module 420 may determine whether the user is busy, in a meeting, driving, exercising, etc., and thereby identifies the most suitable moment for notification delivery. A preference learning module 320 may observe and learn from the user's historical interactions with notifications to anticipate future preferences. This preference learning module 320 is driven by machine learning algorithms and learns which notifications are typically dismissed or engaged with and at what times the user prefers not to be disturbed. Based on the analysis from these modules, the delivery method determination module 330 may decide on the optimal way to deliver notifications 440. For example, the delivery method determination module 330 may change a loud notification to a silent one, or may opt for a haptic signal instead, depending on the user's current activity and context assessed by the user status determination module 420. Once the delivery method is decided, a notification modifying module 340 may modify 450 the content of the notifications themselves. For example, sensitive information may be redacted, or messages may be summarized to suit the user's needs when they are busy or in a public place. This ensures the content format is appropriate with both the user's context and privacy settings. Processed notifications may then be sent to one of two destinations: either to be pushed to the device 460 immediately or to be held in the withheld notification list 471 as part of notifications to hold 470. Notifications in this list are stored until the user's status changes to a more suitable context for their delivery, as per the analysis by the notification scheduling module 220, which may schedule the held notifications for delivery at an appropriate time, prioritizing them based on the urgency and importance derived from the user's preferences and the contextual information. Various other modules and methods for notification presentation can be used as well, as discussed and suggested elsewhere herein.

Figure 5:
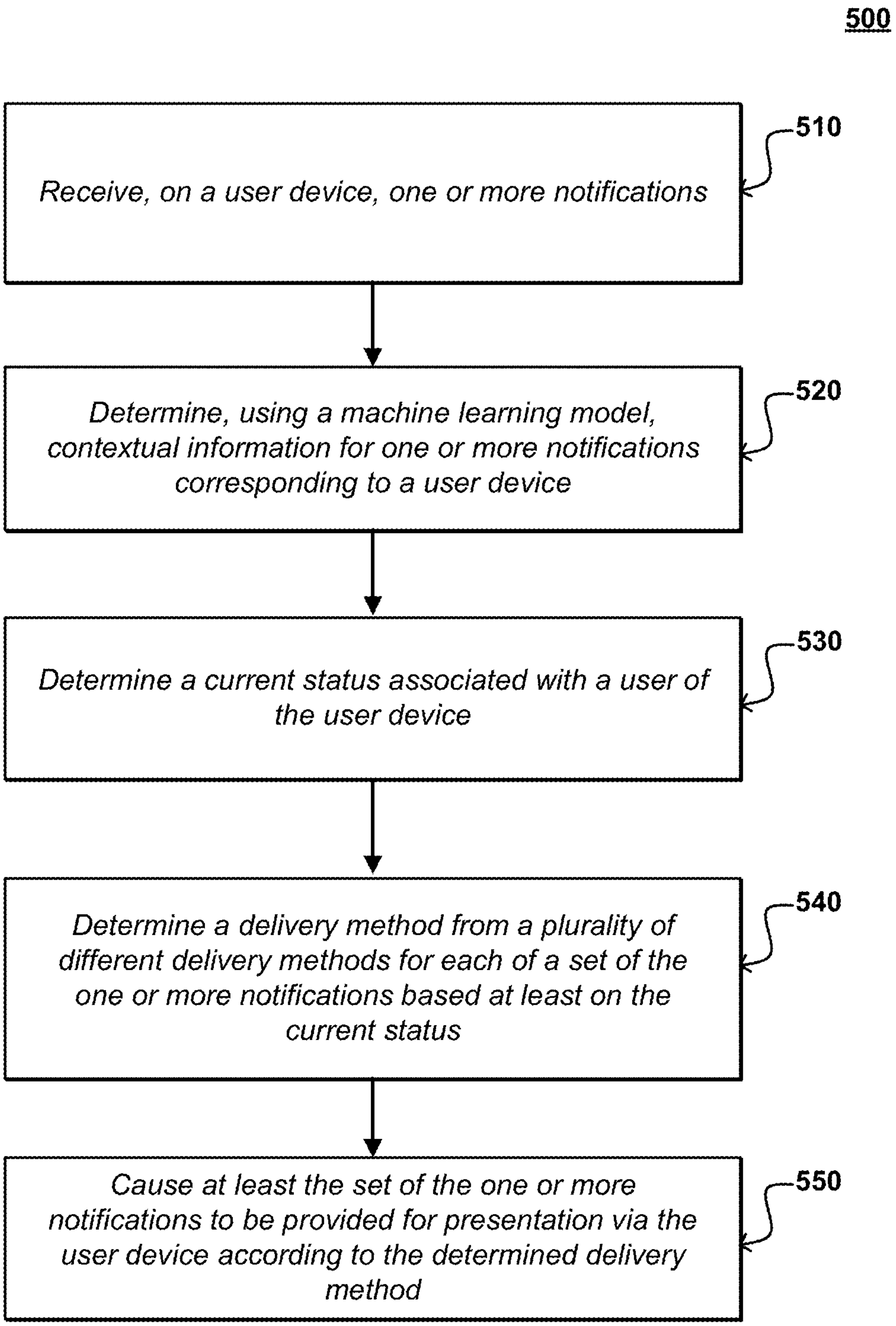
FIG. 5 illustrates an example process of managing notifications using an intelligent notification management system, according to at least one embodiment.

FIG. 5 illustrates an example process for intelligently managing notifications, as may be based on factors such as contextual information and user status. It should be understood that for this and other processes discussed herein that there may be additional, fewer, or alternative steps performed in similar or alternative orders, or at least partially in parallel, within the scope of the various embodiments unless otherwise specifically stated. Further, aspects of such a process may be performed on one or more systems, services, or components as discussed elsewhere herein. This example process 500 can receive 510, at one or more times, a plurality of notifications from one or more sources on a user device. These notifications may be associated with multiple applications, for example, such as a workplace messaging application, a social media application, a messaging application, etc. An artificial intelligence model can be used to determine 520 at least contextual information for the individual notifications. A user may configure, such as through an intelligent notification management system, a level of detail that the system can assess to interpret the contextual information. For example, semantic analysis may be conducted on the metadata or content associated with the notification. In at least one embodiment, a notification may be labeled or tagged based on contextual information. For example, tags may include work, non-work, urgent, personal, direct message, high priority, medium priority, low priority, entertainment, etc. A status associated with the user can be determined 530 based at least in part on user-related data. User-related data such as the user's calendar, preferences, whether the user is in a meeting, driving, on a phone call, etc., may be considered. A delivery method can be determined 540 for each notification of the plurality of notifications. For example, a delivery method may be determined to involve sending the notification immediately, suppressing the notification, modifying the notification before pushing it, or adjusting the delivery method, such as using an audio alert, digitized speech, or vibration. Based on the determination of the delivery method, at least a set of the plurality of notifications may be presented 550 via the user device according to the determined delivery methods, where those presentations may occur at different times, in different ways, and with different types or levels of content, among other possible variations.

Figure 6:
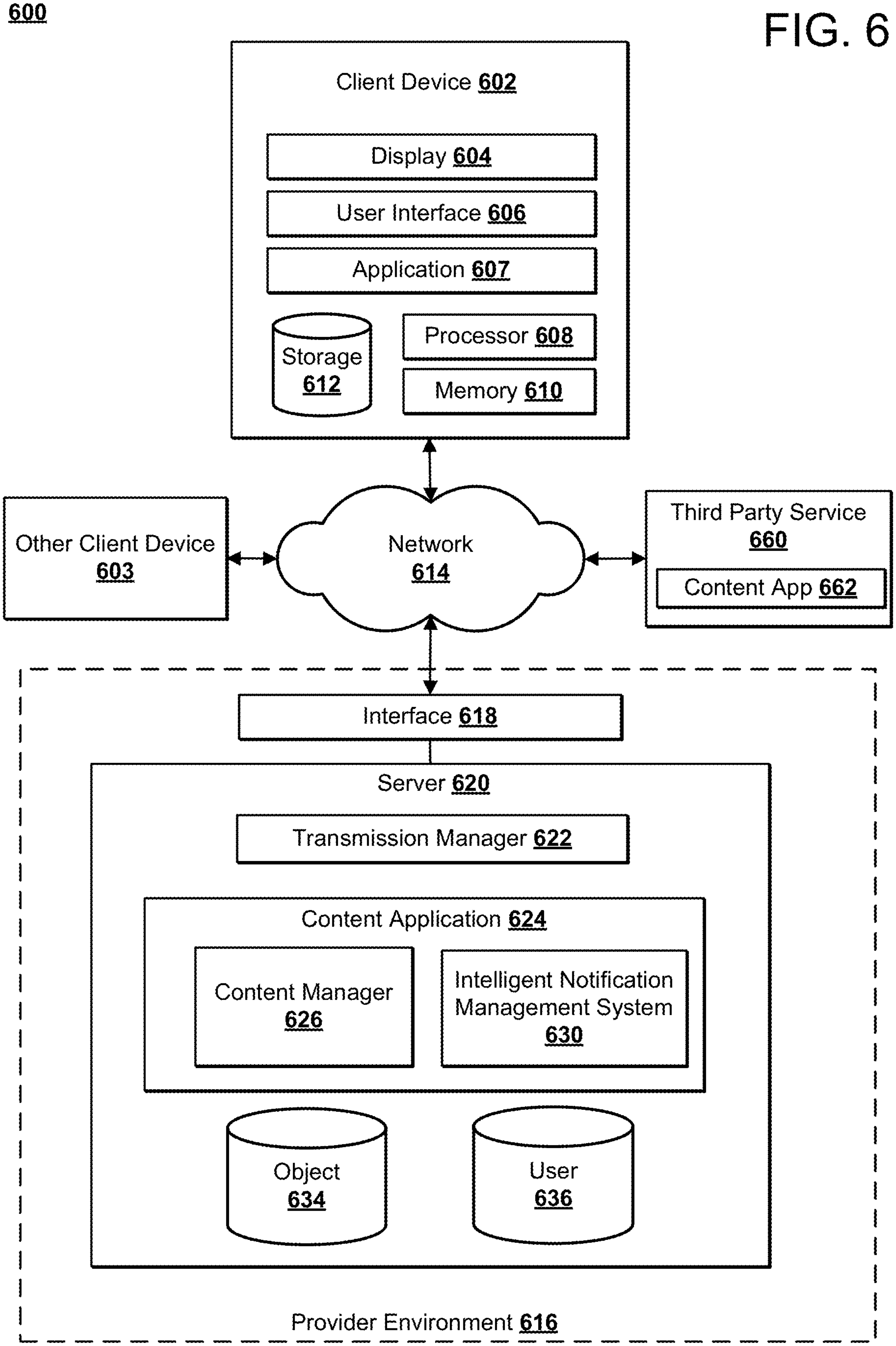
FIG. 6 illustrates an example system environment that includes an intelligent notification management system, according to at least one embodiment.

FIG. 6 illustrates an example system environment that includes an intelligent notification management system, in accordance with various embodiments. As an example, FIG. 6 illustrates an example networked system 600 that can be used to provide, generate, modify, encode, process, and/or transmit data or other content. The example networked system 600 may include a client device 602, other client device 603, a network 614, a third party service 660, and a provider environment 616 that includes an intelligent notification management system 630.

The client device 602 may generate or receive data for a session using components of an application 607 on client device 602 and data stored locally on that client device 602. As an example, a user may utilize a client device 602 to perform intelligent notification management using the application 607. Although only one client device 602 is illustrated in detail, the example networked system 600 may include one or more other client devices 603 that can communicate with the provider environment 616 through the network 614. A client device 602 may be any appropriate computing device capable of enabling a user to perform tasks related to intelligent notification management as discussed herein, such as may include a desktop computer, notebook computer, computer workstation, gaming console, set-top box, streaming device, smartphone, tablet computer, VR headset, AR goggles, wearable computer, or a smart television. In at least one embodiment, a user can access results from intelligent notification management using a user interface (UI) 606 running on a client device 602, although at least some functionality may also operate on a remote device, networked device, or through a cloud computing platform. In at least one embodiment, a user can provide input to the UI 606, such as through a touch-sensitive display 604 or by moving a mouse cursor displayed on a display screen. In one embodiment, a user may be able to provide inputs such as preferences and configuration data to an application 607. The application 607 may be provided by the provider environment 616 for the user to download on the client device 602. In at least one embodiment, a client device can include at least one processor 608 (e.g., a CPU or GPU), a storage 612, and a memory 610 to execute application 607 and/or perform tasks on behalf of application 607.

In one embodiment, each client device 602 can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

The network 614 may represent the communication pathways among the client device 602, the provider environment 616, other client device 603, and the third party service 660. Through the network 614, the client device 602 may send input information associated with stream data processing over the network 614. The information may be received by a remote computing system, as may be part of a resource provider environment 616. In one embodiment, the network 614 is the Internet. The network 614 can include any appropriate network, including an intranet, Internet, a cellular network, a local area network (LAN), or any other such network or combination, and communication over a network can be enabled via wired and/or wireless connections. The network 614 can also utilize dedicated or private communication links that are not necessarily part of the Internet. In one embodiment, the network 614 uses standard communications technologies and/or protocols. Thus, the network 614 can include links using technologies such as Ethernet, Wi-Fi, integrated services digital network (ISDN), digital subscriber lines (DSL), asynchronous transfer mode (ATM), etc. Similarly, the networking protocols used on the network 614 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, such as long term evolution (LTE). The data exchanged over the network 614 can be represented using technologies or formats including the hypertext markup language (XML), the wireless access protocol (WAP), the short message service (SMS) etc. In addition, all or some of the links can be encrypted using conventional encryption technologies such as the secure sockets layer (SSL), secure HTTP or virtual private networks (VPNs). In another embodiment, the client device 602 can use custom and/or dedicated data communications technologies instead of, or in addition to, the ones described above.

The provider environment 616 may include any appropriate components for receiving requests and returning information or performing actions in response to those requests. In the embodiment illustrated in FIG. 6, the provider environment 616 may include an interface 618, and a server 620 that include various components for performing tasks associated with intelligent notification management. In at least one embodiment, the provider environment 616 might include Web servers and/or application servers for receiving and processing requests, then returning data or other content or information in response to a request.

The interface 618 may receive communications to the server 620. In at least one embodiment, the interface 618 can include application programming interfaces (APIs) or other exposed interfaces enabling a user to submit requests to the server 620. In at least one embodiment, the interface 618 can include other components as well, such as at least one Web server, routing components, or load balancers. In at least one embodiment, components of an interface 618 can determine a type of request or communication, and can direct a request to an appropriate system or service such as the intelligent notification management system 630.

The server 620 may include a transmission manager 622, a content application 624, an object repository 634, and a user database 636. The server 620 may receive requests and data from the client device 602, perform tasks associated with the requests, and send results or other data to the client device 602. In at least one embodiment, a content application 624 executing on the server 620 (e.g., a cloud server or edge server) may initiate a session associated with the client device 602, as may use a session manager and user data stored in a user database 636, and can cause content such as one or more object representations from an object repository 634 to be selected by a content manager 626 for processing. At least a portion of the generated content, such as results from stream data processing may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding application 607 for selecting, providing, synthesizing, modifying, or using content for presentation (or other purposes) on or by the client device 602. A decoder may also be used to decode data received over the network 614 for presentation via client device 602, such as image or video content through a touch-sensitive display 604. In at least one embodiment, at least some of the content may already be stored on, rendered on, or accessible to client device 602 such that transmission over the network 614 is not required for at least that portion of content, such as where the content may have been previously downloaded or stored locally on a hard drive or optical disk. In at least one embodiment, a transmission mechanism such as data streaming can be used to transfer the content from the server 620, or user database 636, to client device 602. In at least one embodiment, at least a portion of this content can be obtained, enhanced, and/or streamed from another source, such as a third party service 660 or other client device 603, that may also include a content application 662 for generating, enhancing, or providing content. In at least one embodiment, portions of this functionality can be performed using multiple computing devices, or multiple processors within one or more computing devices, such as may include a combination of CPUs and GPUs.

In at least one embodiment, the server 620 may include a processor such as a central processing unit (CPU). In at least one embodiment, however, resources in such environments can utilize GPUs to process data for at least certain types of requests. In at least one embodiment, with thousands of cores, GPUs are designed to handle substantial parallel workloads and, therefore, have become popular in deep learning for training neural networks and generating predictions. In at least one embodiment, while use of GPUs for offline builds has enabled faster training of larger and more complex models, generating predictions offline implies that either request-time input features cannot be used or predictions must be generated for all permutations of features and stored in a lookup table to serve real-time requests. In at least one embodiment, if a deep learning framework supports a CPU-mode and a model is small and simple enough to perform a feed-forward on a CPU with a reasonable latency, then a service on a CPU instance could host a model. In at least one embodiment, training can be done offline on a GPU and inference done in real-time on a CPU. In at least one embodiment, if a CPU approach is not a viable option, then a service can run on a GPU instance. In at least one embodiment, because GPUs have different performance and cost characteristics than CPUs, however, running a service that offloads a runtime algorithm to a GPU can require it to be designed differently from a CPU based service.

The server 620 may include a content application 624 that includes a content manager 626 and an intelligent notification management system 630. As discussed previously, the content manager 626 may send objects, such as datasets and instructions, from the object repository 634 along with requests and other data from the client device 602 to the intelligent notification management system 630 for stream data processing. The intelligent notification management system 630 may process input data and provide the results to the transmission manager 622 for sending back to the client device 602. The intelligent notification management system 630 may also use local datasets or datasets provided by the third party service 660 for stream data processing.

DATA CENTER

Figure 7:
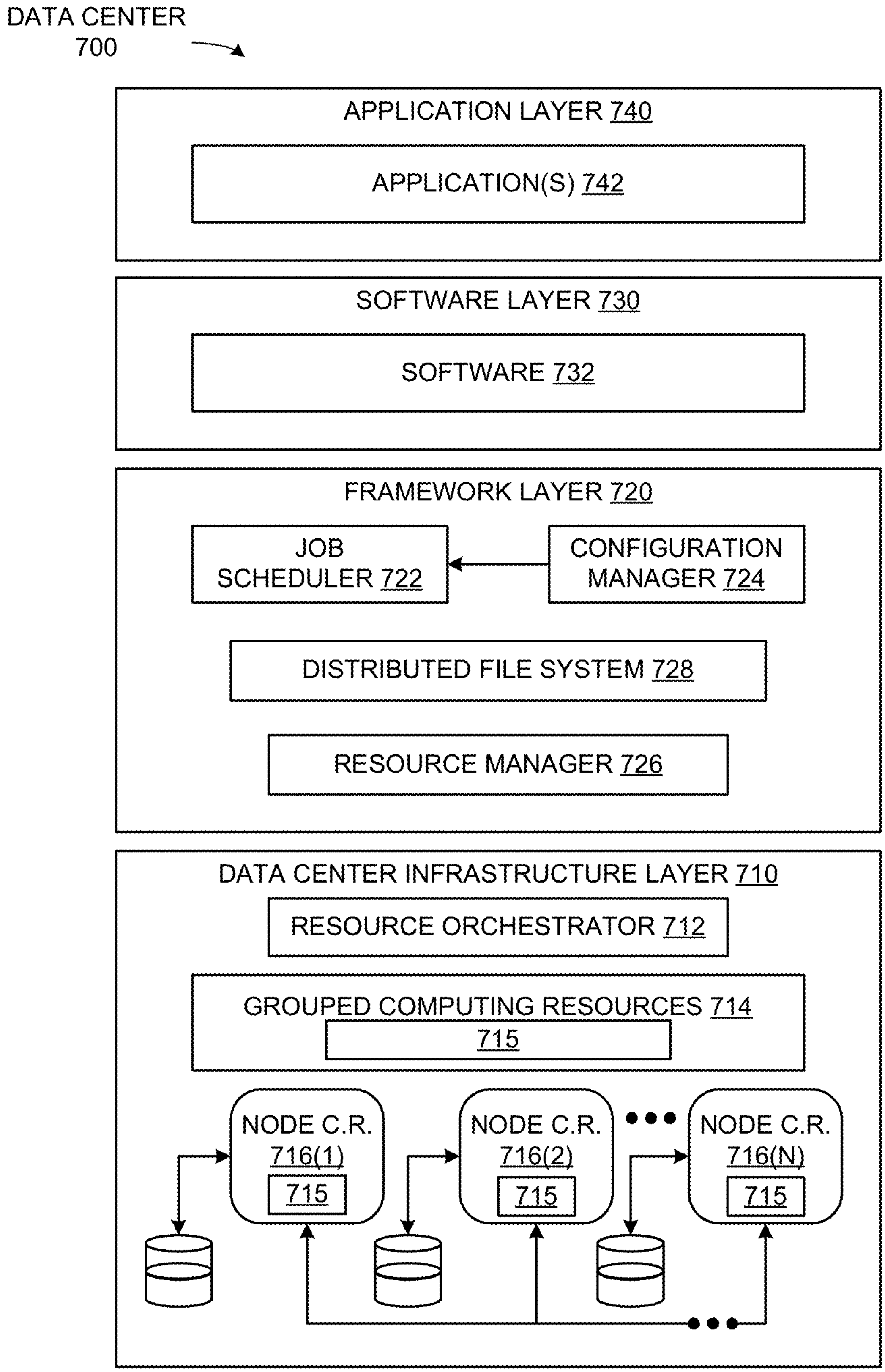
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in system FIG. 7 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

COMPUTER SYSTEMS

Figure 8:
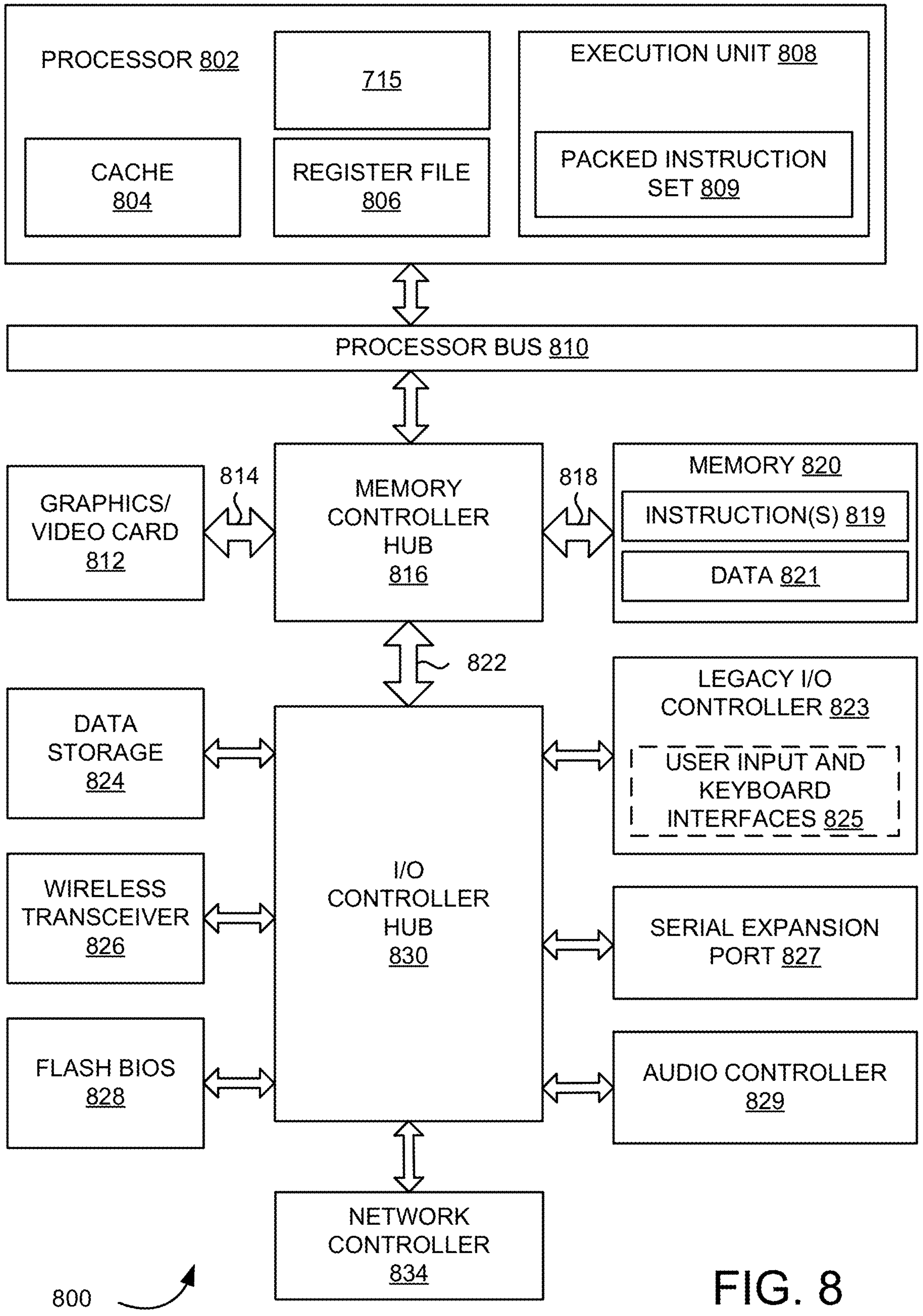
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data, and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 715 are used to perform inferencing and/or training operations associated with one or more embodiments. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 9:
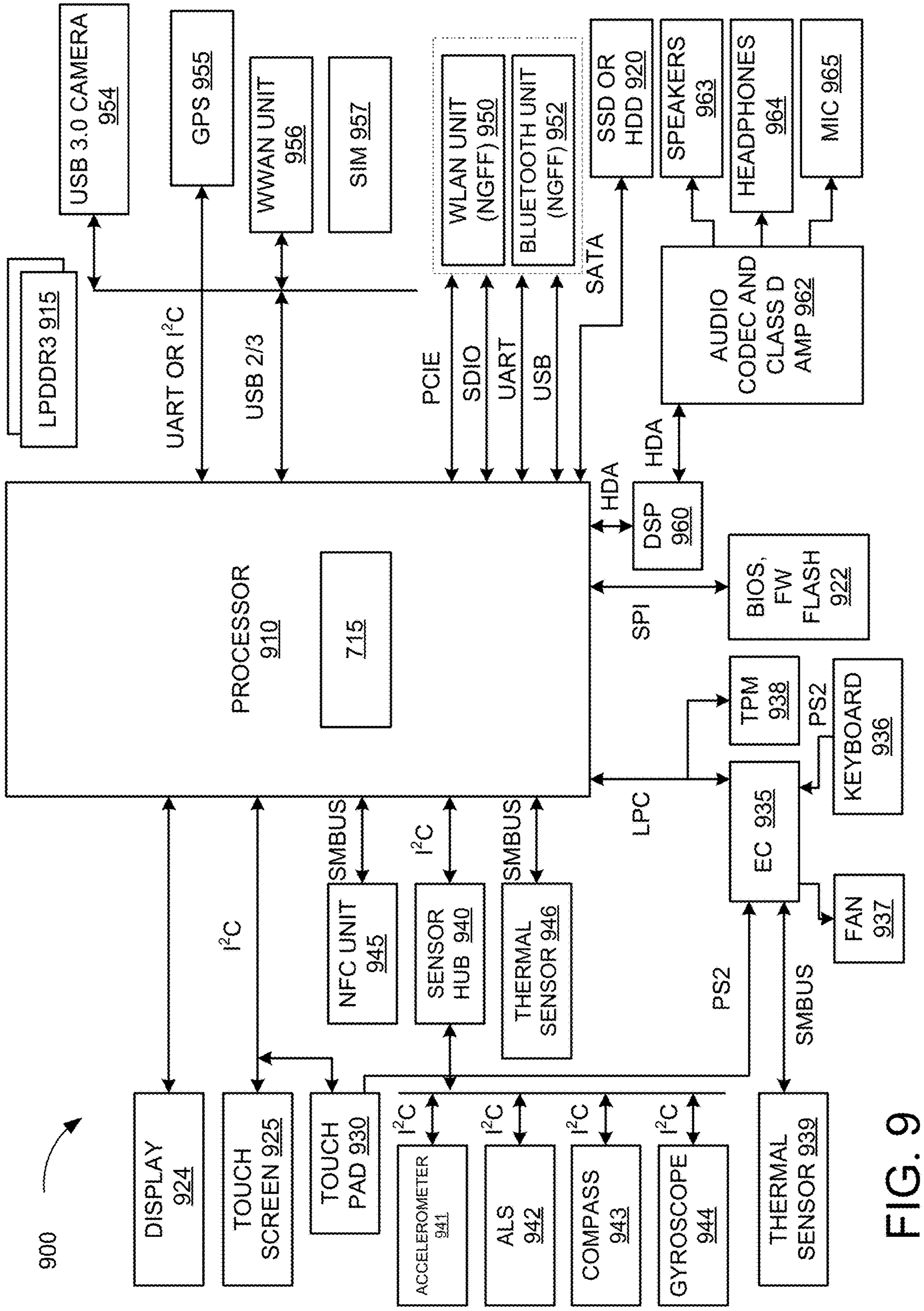
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 715 are used to perform inferencing and/or training operations associated with one or more embodiments. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 10:
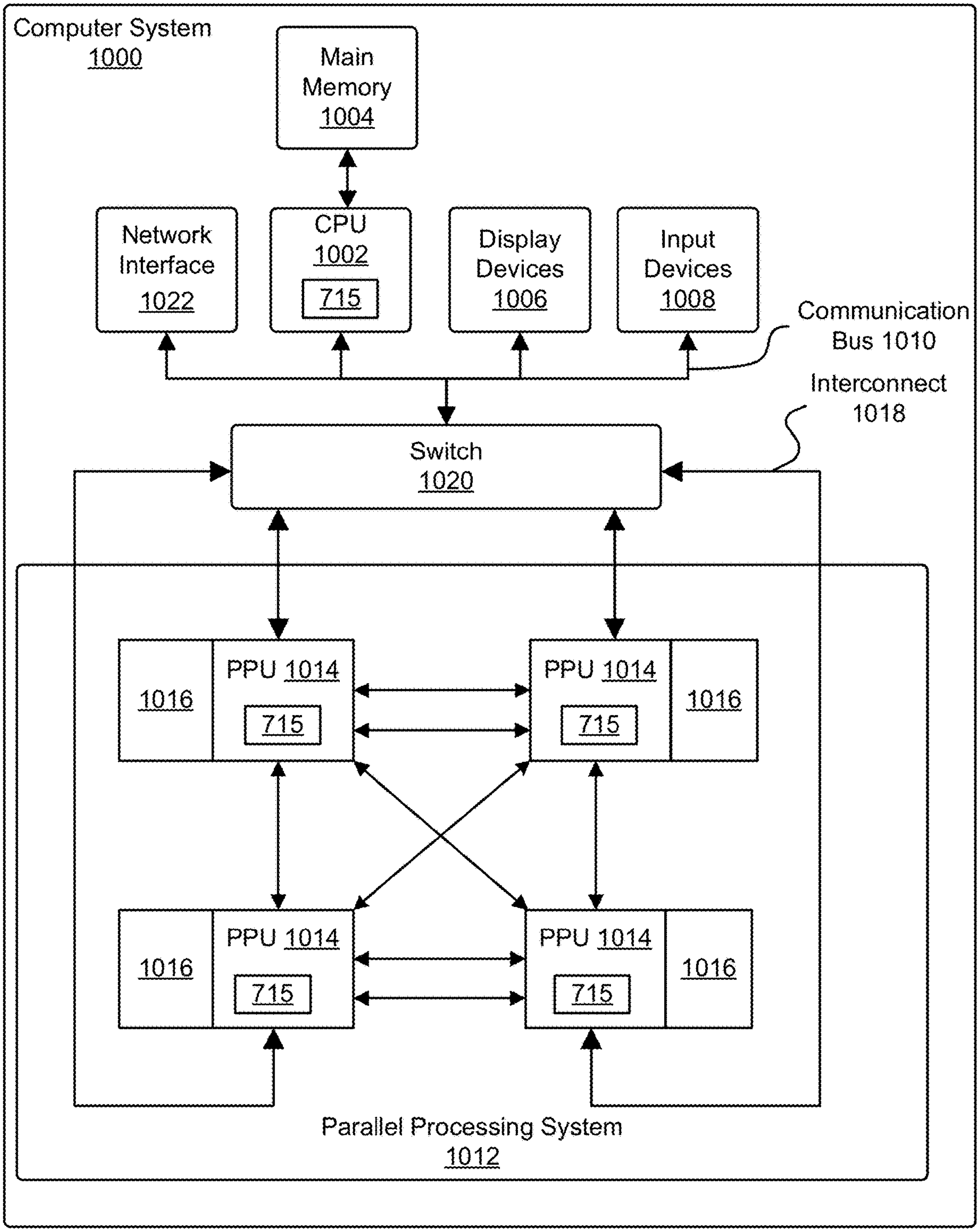
FIG. 10 illustrates a computer system, according to at least one embodiment.

FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Inference and/or training logic 715 are used to perform inferencing and/or training operations associated with one or more embodiments. In at least one embodiment, inference and/or training logic 715 may be used in system FIG. 01 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 11:
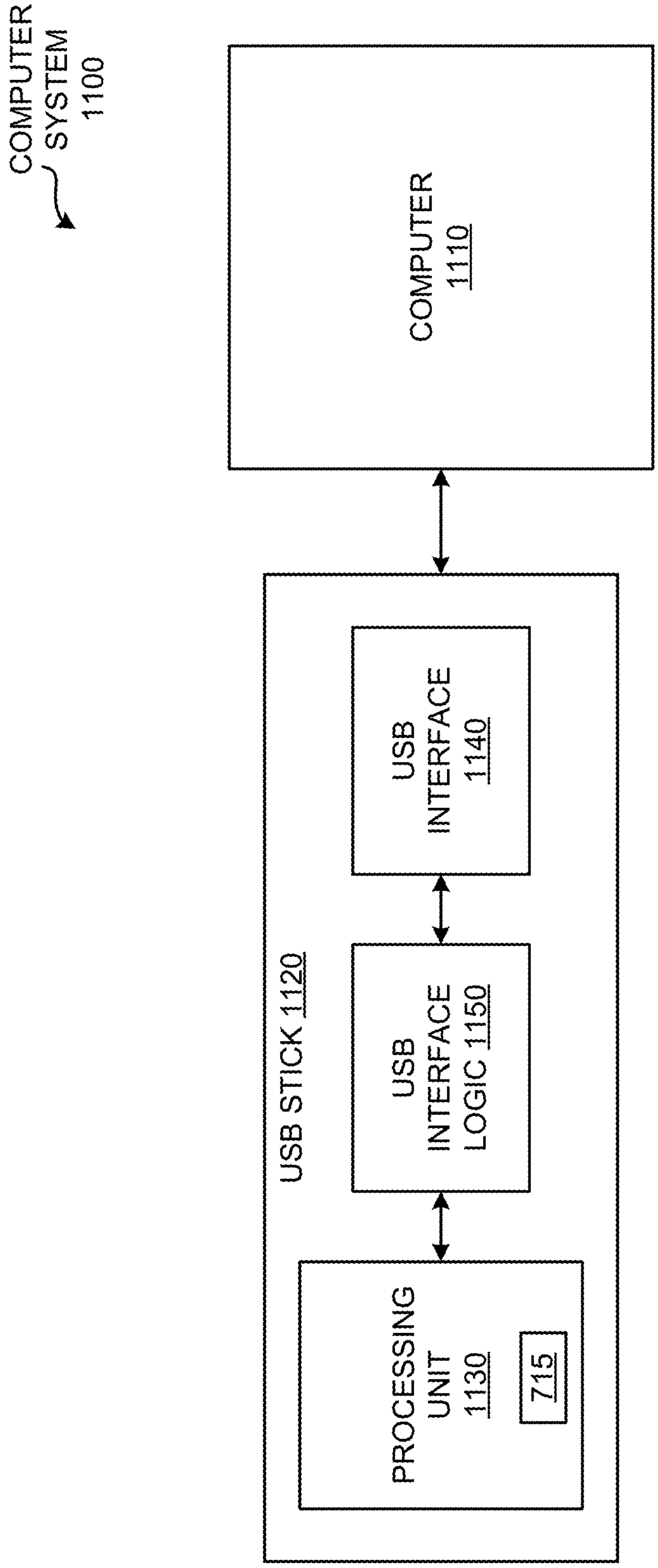
FIG. 11 illustrates a computer system, according to at least one embodiment.

FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 1150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 1150 may include any amount and type of logic that enables processing unit 1130 to interface with devices (e.g., computer 1110) via USB connector 1140.

Inference and/or training logic 715 are used to perform inferencing and/or training operations associated with one or more embodiments. In at least one embodiment, inference and/or training logic 715 may be used in system FIG. 11 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 12:
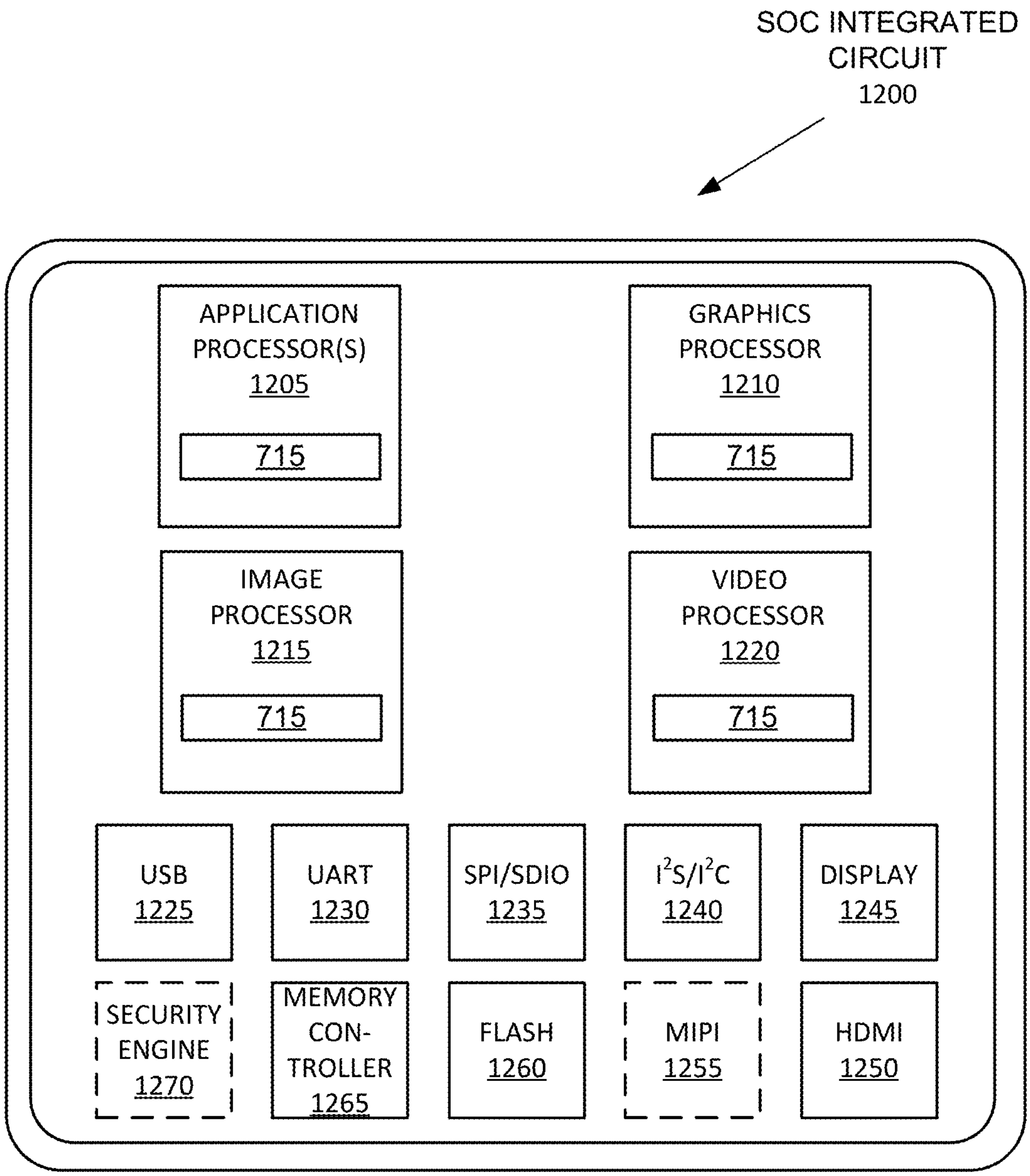
FIG. 12 illustrates exemplary integrated circuits and associated graphics processors, according to at least one embodiment.

FIG. 12 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 12 is a block diagram illustrating an exemplary system-on-a-chip (SOC) integrated circuit 1200 that may be fabricated using one or more IP cores, according to at least one embodiment. In at least one embodiment, SOC integrated circuit 1200 includes one or more application processor(s) 1205 (e.g., CPUs), at least one graphics processor 1210, and may additionally include an image processor 1215 and/or a video processor 1220, any of which may be a modular IP core. In at least one embodiment, SOC integrated circuit 1200 includes peripheral or bus logic including a USB controller 1225, a UART controller 1230, an SPI/SDIO controller 1235, and an $I^2S/I^2C$ controller 1240. In at least one embodiment, SOC integrated circuit 1200 can include a display device 1245 coupled to one or more of a high-definition multimedia interface (HDMI) controller 1250 and a mobile industry processor interface (MIPI) display interface 1255. In at least one embodiment, storage may be provided by a flash memory subsystem 1260 including flash memory and a flash memory controller. In at least one embodiment, a memory interface may be provided via a memory controller 1265 for access to SDRAM or SRAM memory devices. In at least one embodiment, some integrated circuits additionally include an embedded security engine 1270.

Inference and/or training logic 715 are used to perform inferencing and/or training operations associated with one or more embodiments. In at least one embodiment, inference and/or training logic 715 may be used in SOC integrated circuit 1200 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 13A:
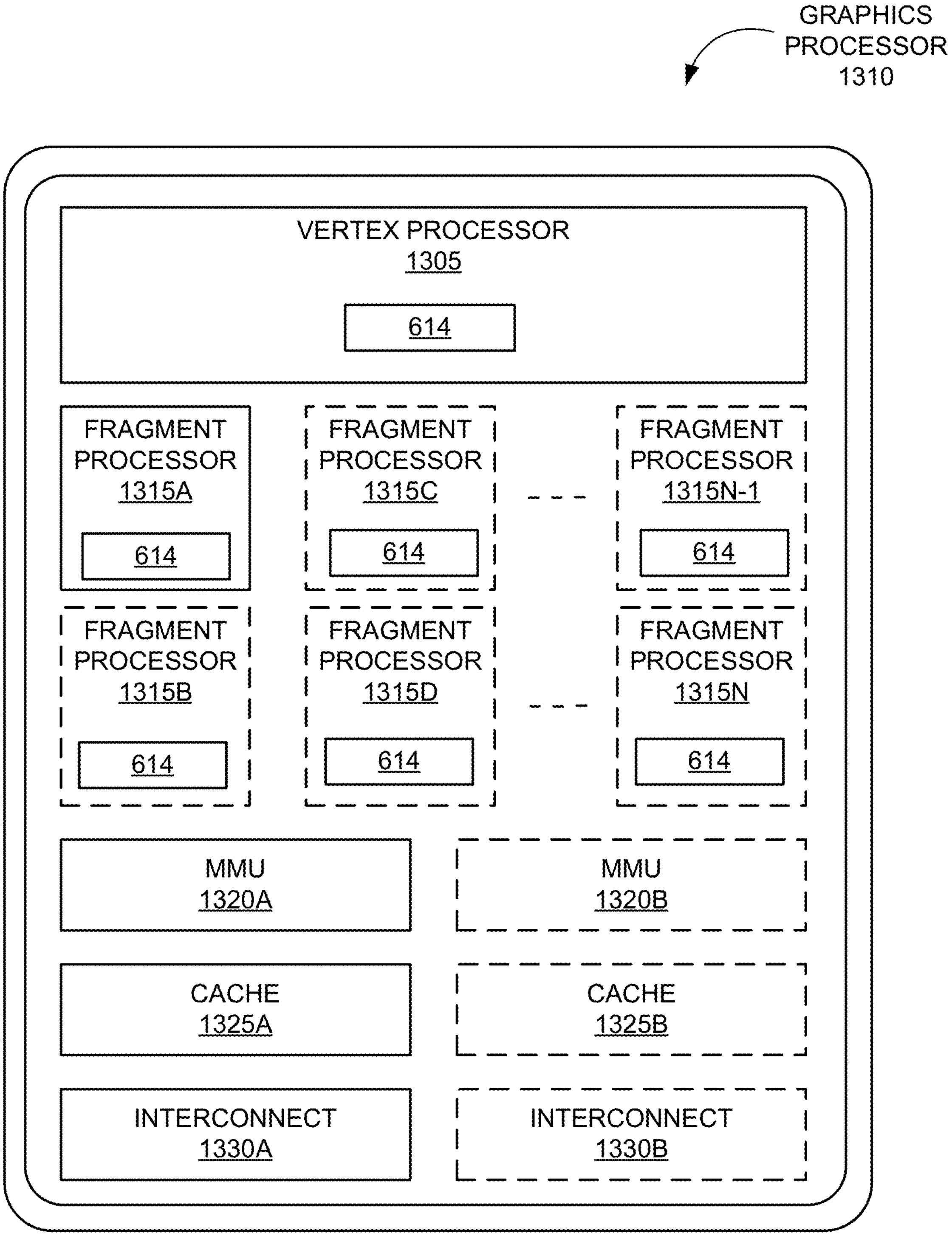
FIGS. 13A, 13B illustrate exemplary integrated circuits and associated graphics processors, according to at least one embodiment.
Figure 13B:
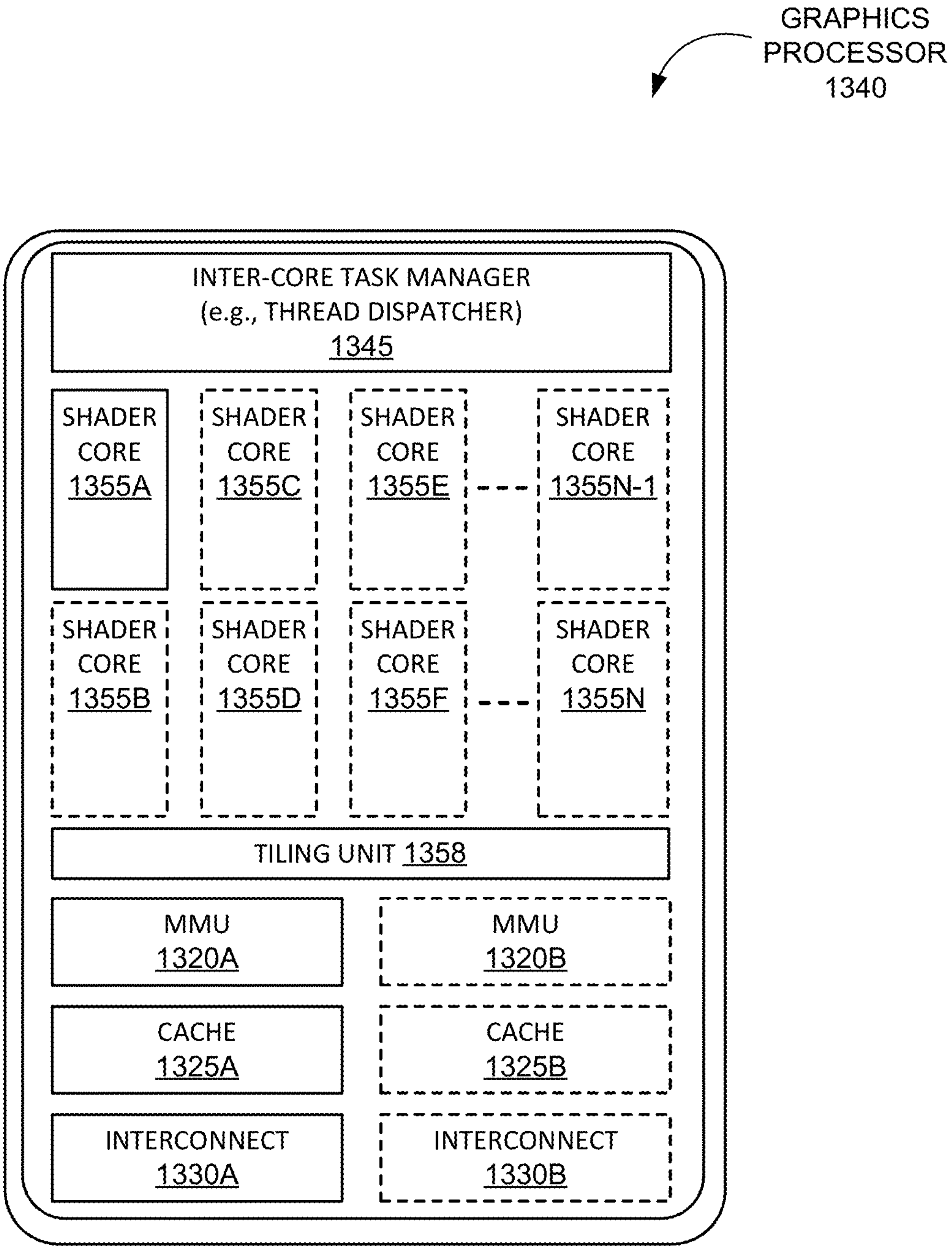

FIGS. 13A-13B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to at least one embodiment. FIG. 13B illustrates an additional exemplary graphics processor 1340 of a system on a chip integrated circuit that may be fabricated using one or more IP cores, according to at least one embodiment. In at least one embodiment, graphics processor 1310 of FIG. 13A is a low power graphics processor core. In at least one embodiment, graphics processor 1340 of FIG. 13B is a higher performance graphics processor core. In at least one embodiment, each of graphics processors 1310, 1340 can be variants of computer system 1100 of FIG. 11.

In at least one embodiment, graphics processor 1310 includes a vertex processor 1305 and one or more fragment processor(s) 1315A-1315N (e.g., 1315A, 1315B, 1315C, 1315D, through 1315N-1, and 1315N). In at least one embodiment, graphics processor 1310 can execute different shader programs via separate logic, such that vertex processor 1305 is optimized to execute operations for vertex shader programs, while one or more fragment processor(s) 1315A-1315N execute fragment (e.g., pixel) shading operations for fragment or pixel shader programs. In at least one embodiment, vertex processor 1305 performs a vertex processing stage of a 3D graphics pipeline and generates primitives and vertex data. In at least one embodiment, fragment processor(s) 1315A-1315N use primitive and vertex data generated by vertex processor 1305 to produce a framebuffer that is displayed on a display device. In at least one embodiment, fragment processor(s) 1315A-1315N are optimized to execute fragment shader programs as provided for in an OpenGL API, which may be used to perform similar operations as a pixel shader program as provided for in a Direct 3D API.

In at least one embodiment, graphics processor 1310 additionally includes one or more memory management units (MMUs) 1320A-1320B, cache(s) 1325A-1325B, and circuit interconnect(s) 1330A-1330B. In at least one embodiment, one or more MMU(s) 1320A-1320B provide for virtual to physical address mapping for graphics processor 1310, including for vertex processor 1305 and/or fragment processor(s) 1315A-1315N, which may reference vertex or image/texture data stored in memory, in addition to vertex or image/texture data stored in one or more cache(s) 1325A-1325B. In at least one embodiment, one or more MMU(s) 1320A-1320B may be synchronized with other MMUs within a system, including one or more MMUs associated with one or more application processor(s) 1305, image processors 1315, and/or video processors 1320 of FIG. 13A, such that each processor 1305-1320 can participate in a shared or unified virtual memory system. In at least one embodiment, one or more circuit interconnect(s) 1330A-1330B enable graphics processor 1310 to interface with other IP cores within SoC, either via an internal bus of SoC or via a direct connection.

In at least one embodiment, graphics processor 1340 includes one or more shader core(s) 1355A-1355N (e.g., 1355A, 1355B, 1355C, 1355D, 1355E, 1355F, through 1355N-1, and 1355N) as shown in FIG. 13B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Embodiments presented herein can allow for a linear regulator with one or more features for improving the PSRR to identify and correct voltage noise within a circuit.

Figure 14:
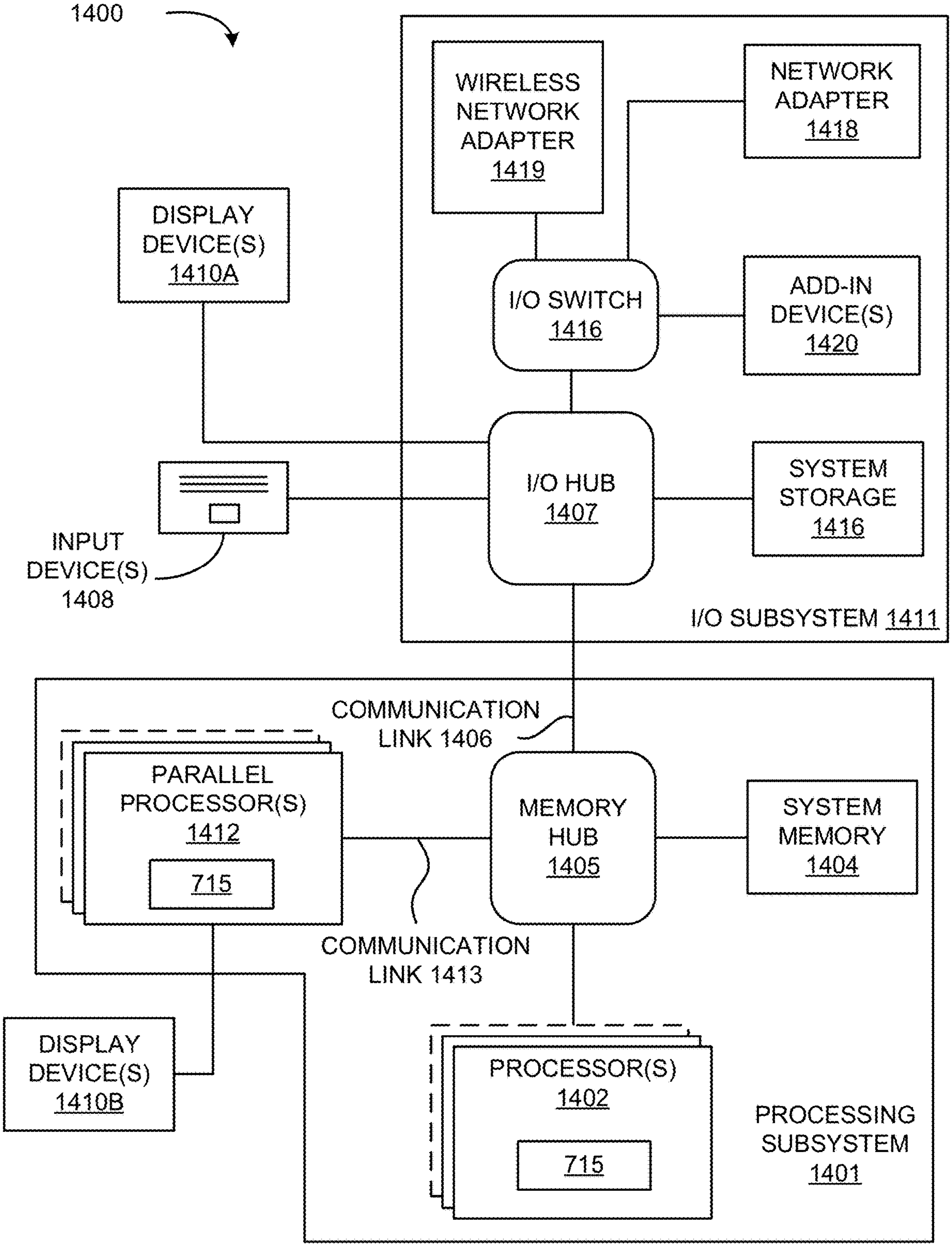
FIG. 14 illustrates a computer system, according to at least one embodiment.

FIG. 14 is a block diagram illustrating a computing system 1400 according to at least one embodiment. In at least one embodiment, computing system 1400 includes a processing subsystem 1401 having one or more processor(s) 1402 and a system memory 1404 communicating via an interconnection path that may include a memory hub 1405. In at least one embodiment, memory hub 1405 may be a separate component within a chipset component or may be integrated within one or more processor(s) 1402. In at least one embodiment, memory hub 1405 couples with an I/O subsystem 1411 via a communication link 1406. In at least one embodiment, I/O subsystem 1411 includes an I/O hub 1407 that can enable computing system 1400 to receive input from one or more input device(s) 1408. In at least one embodiment, I/O hub 1407 can enable a display controller, which may be included in one or more processor(s) 1402, to provide outputs to one or more display device(s) 1410A. In at least one embodiment, one or more display device(s) 1410A coupled with I/O hub 1407 can include a local, internal, or embedded display device.

In at least one embodiment, processing subsystem 1401 includes one or more parallel processor(s) 1412 coupled to memory hub 1405 via a bus or other communication link 1413. In at least one embodiment, communication link 1413 may use one of any number of standards based communication link technologies or protocols, such as but not limited to PCI Express, or may be a vendor-specific communications interface or communications fabric. In at least one embodiment, one or more parallel processor(s) 1412 form a computationally focused parallel or vector processing system that can include a large number of processing cores and/or processing clusters, such as a many-integrated core (MIC) processor. In at least one embodiment, some or all of parallel processor(s) 1412 form a graphics processing subsystem that can output pixels to one of one or more display device(s) 1410A coupled via I/O hub 1407. In at least one embodiment, parallel processor(s) 1412 can also include a display controller and display interface (not shown) to enable a direct connection to one or more display device(s) 1410B. In at least one embodiment, parallel processor(s) 1412 include one or more cores, such as graphics cores 1400 discussed herein.

In at least one embodiment, a system storage unit 1414 can connect to I/O hub 1407 to provide a storage mechanism for computing system 1400. In at least one embodiment, an I/O switch 1416 can be used to provide an interface mechanism to enable connections between I/O hub 1407 and other components, such as a network adapter 1418 and/or a wireless network adapter 1419 that may be integrated into platform, and various other devices that can be added via one or more add-in device(s) 1420. In at least one embodiment, network adapter 1418 can be an Ethernet adapter or another wired network adapter. In at least one embodiment, wireless network adapter 1419 can include one or more of a Wi-Fi, Bluetooth, near field communication (NFC), or other network device that includes one or more wireless radios.

In at least one embodiment, computing system 1400 can include other components not explicitly shown, including USB or other port connections, optical storage drives, video capture devices, and like, may also be connected to I/O hub 1407. In at least one embodiment, communication paths interconnecting various components in FIG. 14 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1412 incorporate circuitry optimized for graphics and video processing, including, for example, video output circuitry, and constitutes a graphics processing unit (GPU), e.g., parallel processor(s) 1412 includes graphics core 1400. In at least one embodiment, parallel processor(s) 1412 incorporate circuitry optimized for general purpose processing. In at least embodiment, components of computing system 1400 may be integrated with one or more other system elements on a single integrated circuit. For example, in at least one embodiment, parallel processor(s) 1412, memory hub 1405, processor(s) 1402, and I/O hub 1407 can be integrated into a system on chip (SoC) integrated circuit. In at least one embodiment, components of computing system 1400 can be integrated into a single package to form a system in package (SIP) configuration. In at least one embodiment, at least a portion of components of computing system 1400 can be integrated into a multi-chip module (MCM), which can be interconnected with other multi-chip modules into a modular computing system.

Inference and/or training logic 715 are used to perform inferencing and/or training operations associated with one or more embodiments. In at least one embodiment, inference and/or training logic 715 may be used in system FIG. 14 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

PROCESSORS

Figure 15A:
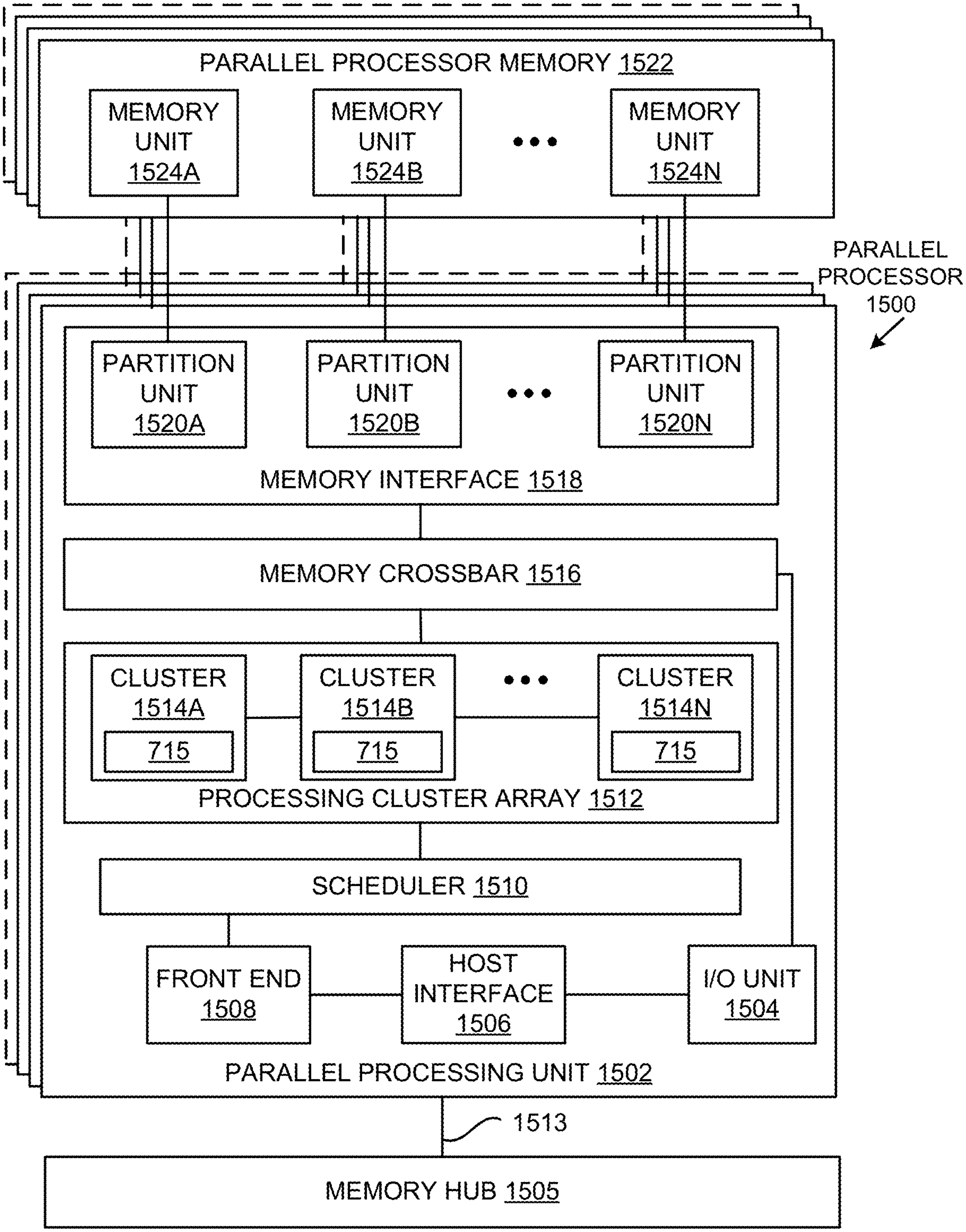
FIG. 15A illustrates a parallel processor, according to at least one embodiment.

FIG. 15A illustrates a parallel processor 1500 according to at least one embodiment. In at least one embodiment, various components of parallel processor 1500 may be implemented using one or more integrated circuit devices, such as programmable processors, application specific integrated circuits (ASICs), or field programmable gate arrays (FPGA). In at least one embodiment, illustrated parallel processor 1500 is a variant of one or more parallel processor(s) 1412 shown in FIG. 14 according to an exemplary embodiment. In at least one embodiment, a parallel processor 1500 includes one or more graphics cores 1400.

In at least one embodiment, parallel processor 1500 includes a parallel processing unit 1502. In at least one embodiment, parallel processing unit 1502 includes an I/O unit 1504 that enables communication with other devices, including other instances of parallel processing unit 1502. In at least one embodiment, I/O unit 1504 may be directly connected to other devices. In at least one embodiment, I/O unit 1504 connects with other devices via use of a hub or switch interface, such as a memory hub 1505. In at least one embodiment, connections between memory hub 1505 and I/O unit 1504 form a communication link 1513. In at least one embodiment, I/O unit 1504 connects with a host interface 1506 and a memory crossbar 1516, where host interface 1506 receives commands directed to performing processing operations and memory crossbar 1516 receives commands directed to performing memory operations.

In at least one embodiment, when host interface 1506 receives a command buffer via I/O unit 1504, host interface 1506 can direct work operations to perform those commands to a front end 1508. In at least one embodiment, front end 1508 couples with a scheduler 1510 (which may be referred to as a sequencer), which is configured to distribute commands or other work items to a processing cluster array 1512. In at least one embodiment, scheduler 1510 ensures that processing cluster array 1512 is properly configured and in a valid state before tasks are distributed to a cluster of processing cluster array 1512. In at least one embodiment, scheduler 1510 is implemented via firmware logic executing on a microcontroller. In at least one embodiment, microcontroller implemented scheduler 1510 is configurable to perform complex scheduling and work distribution operations at coarse and fine granularity, enabling rapid preemption and context switching of threads executing on processing array 1512. In at least one embodiment, host software can prove workloads for scheduling on processing cluster array 1512 via one of multiple graphics processing paths. In at least one embodiment, workloads can then be automatically distributed across processing array cluster 1512 by scheduler 1510 logic within a microcontroller including scheduler 1510.

In at least one embodiment, processing cluster array 1512 can include up to "N" processing clusters (e.g., cluster 1514A, cluster 1514B, through cluster 1514N), where "N" represents a positive integer (which may be a different integer "N" than used in other figures). In at least one embodiment, each cluster 1514A-1514N of processing cluster array 1512 can execute a large number of concurrent threads. In at least one embodiment, scheduler 1510 can allocate work to clusters 1514A-1514N of processing cluster array 1512 using various scheduling and/or work distribution algorithms, which may vary depending on workload arising for each type of program or computation. In at least one embodiment, scheduling can be handled dynamically by scheduler 1510, or can be assisted in part by compiler logic during compilation of program logic configured for execution by processing cluster array 1512. In at least one embodiment, different clusters 1514A-1514N of processing cluster array 1512 can be allocated for processing different types of programs or for performing different types of computations.

In at least one embodiment, processing cluster array 1512 can be configured to perform various types of parallel processing operations. In at least one embodiment, processing cluster array 1512 is configured to perform general-purpose parallel compute operations. For example, in at least one embodiment, processing cluster array 1512 can include logic to execute processing tasks including filtering of video and/or audio data, performing modeling operations, including physics operations, and performing data transformations.

In at least one embodiment, processing cluster array 1512 is configured to perform parallel graphics processing operations. In at least one embodiment, processing cluster array 1512 can include additional logic to support execution of such graphics processing operations, including but not limited to, texture sampling logic to perform texture operations, as well as tessellation logic and other vertex processing logic. In at least one embodiment, processing cluster array 1512 can be configured to execute graphics processing related shader programs such as but not limited to, vertex shaders, tessellation shaders, geometry shaders, and pixel shaders. In at least one embodiment, parallel processing unit 1502 can transfer data from system memory via I/O unit 1504 for processing. In at least one embodiment, during processing, transferred data can be stored to on-chip memory (e.g., parallel processor memory 1522) during processing, then written back to system memory.

In at least one embodiment, when parallel processing unit 1502 is used to perform graphics processing, scheduler 1510 can be configured to divide a processing workload into approximately equal sized tasks, to better enable distribution of graphics processing operations to multiple clusters 1514A-1514N of processing cluster array 1512. In at least one embodiment, portions of processing cluster array 1512 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1514A-1514N may be stored in buffers to allow intermediate data to be transmitted between clusters 1514A-1514N for further processing.

In at least one embodiment, processing cluster array 1512 can receive processing tasks to be executed via scheduler 1510, which receives commands defining processing tasks from front end 1508. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1510 may be configured to fetch indices corresponding to tasks or may receive indices from front end 1508. In at least one embodiment, front end 1508 can be configured to ensure processing cluster array 1512 is configured to a valid state before a workload specified by incoming command buffers (e.g., batch-buffers, push buffers, etc.) is initiated.

In at least one embodiment, each of one or more instances of parallel processing unit 1502 can couple with a parallel processor memory 1522. In at least one embodiment, parallel processor memory 1522 can be accessed via memory crossbar 1516, which can receive memory requests from processing cluster array 1512 as well as I/O unit 1504. In at least one embodiment, memory crossbar 1516 can access parallel processor memory 1522 via a memory interface 1518. In at least one embodiment, memory interface 1618 can include multiple partition units (e.g., partition unit 1520A, partition unit 1520B, through partition unit 1520N) that can each couple to a portion (e.g., memory unit) of parallel processor memory 1522. In at least one embodiment, a number of partition units 1520A-1520N is configured to be equal to a number of memory units, such that a first partition unit 1520A has a corresponding first memory unit 1524A, a second partition unit 1520B has a corresponding memory unit 1524B, and an N-th partition unit 1520N has a corresponding N-th memory unit 1524N. In at least one embodiment, a number of partition units 1520A-1520N may not be equal to a number of memory units.

In at least one embodiment, memory units 1524A-1524N can include various types of memory devices, including dynamic random access memory (DRAM) or graphics random access memory, such as synchronous graphics random access memory (SGRAM), including graphics double data rate (GDDR) memory. In at least one embodiment, memory units 1524A-1524N may also include 3D stacked memory, including but not limited to high bandwidth memory (HBM), HBM2e, or HDM3. In at least one embodiment, render targets, such as frame buffers or texture maps may be stored across memory units 1524A-1524N, allowing partition units 1520A-1520N to write portions of each render target in parallel to efficiently use available bandwidth of parallel processor memory 1522. In at least one embodiment, a local instance of parallel processor memory 1522 may be excluded in favor of a unified memory design that utilizes system memory in conjunction with local cache memory.

In at least one embodiment, any one of clusters 1514A-1514N of processing cluster array 1512 can process data that will be written to any of memory units 1524A-1524N within parallel processor memory 1522. In at least one embodiment, memory crossbar 1516 can be configured to transfer an output of each cluster 1614A-1614N to any partition unit 1520A-1520N or to another cluster 1514A-1514N, which can perform additional processing operations on an output. In at least one embodiment, each cluster 1514A-1514N can communicate with memory interface 1518 through memory crossbar 1516 to read from or write to various external memory devices. In at least one embodiment, memory crossbar 1516 has a connection to memory interface 1518 to communicate with I/O unit 1504, as well as a connection to a local instance of parallel processor memory 1522, enabling processing units within different processing clusters 1514A-1514N to communicate with system memory or other memory that is not local to parallel processing unit 1502. In at least one embodiment, memory crossbar 1516 can use virtual channels to separate traffic streams between clusters 1514A-1514N and partition units 1520A-1520N.

In at least one embodiment, multiple instances of parallel processing unit 1502 can be provided on a single add-in card, or multiple add-in cards can be interconnected. In at least one embodiment, different instances of parallel processing unit 1502 can be configured to interoperate even if different instances have different numbers of processing cores, different amounts of local parallel processor memory, and/or other configuration differences. For example, in at least one embodiment, some instances of parallel processing unit 1502 can include higher precision floating point units relative to other instances. In at least one embodiment, systems incorporating one or more instances of parallel processing unit 1502 or parallel processor 1500 can be implemented in a variety of configurations and form factors, including but not limited to desktop, laptop, or handheld personal computers, servers, workstations, game consoles, and/or embedded systems.

Figure 15B:
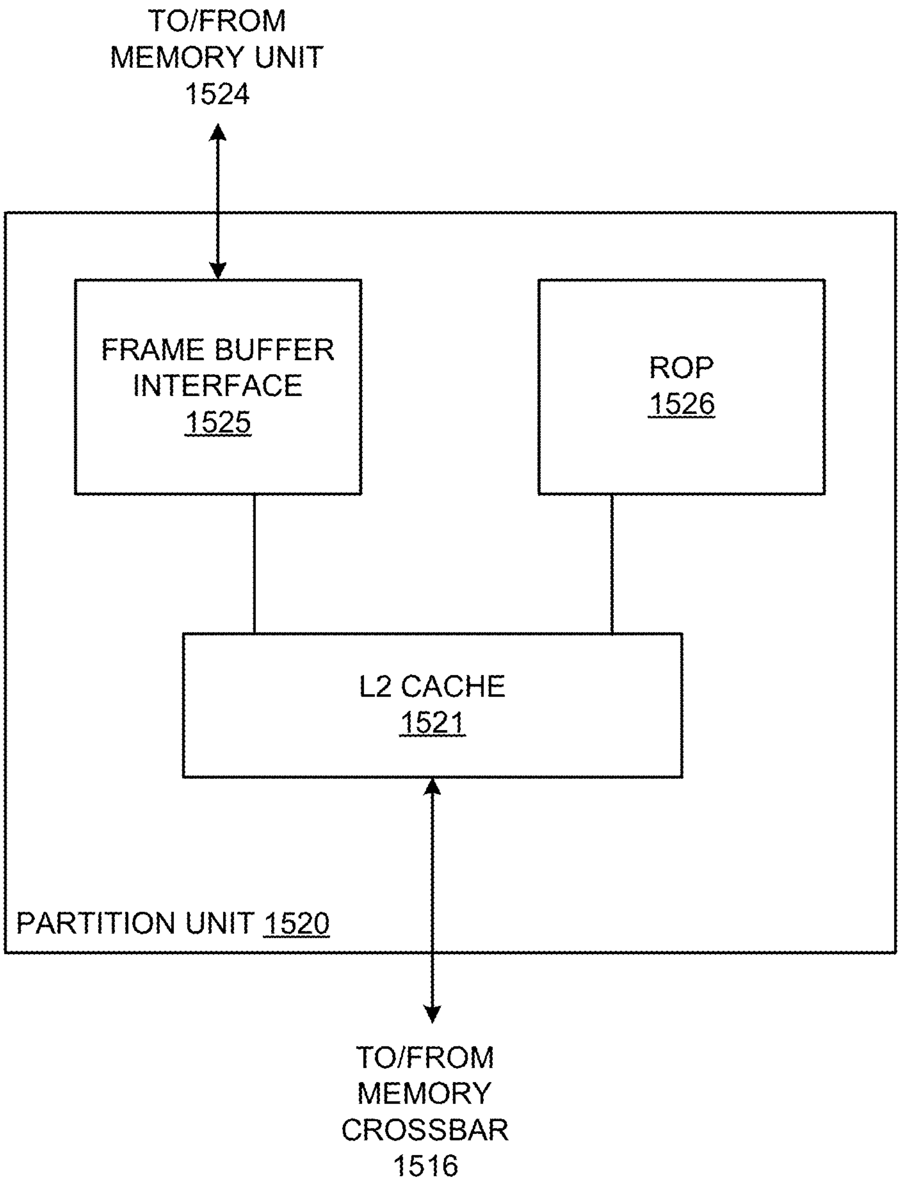
FIG. 15B illustrates a partition unit, according to at least one embodiment.

FIG. 15B is a block diagram of a partition unit 1520 according to at least one embodiment. In at least one embodiment, partition unit 1520 is an instance of one of partition units 1520A-1520N of FIG. 15A. In at least one embodiment, partition unit 1520 includes an L2 cache 1521, a frame buffer interface 1525, and a ROP 1526 (raster operations unit). In at least one embodiment, L2 cache 1621 is a read/write cache that is configured to perform load and store operations received from memory crossbar 1516 and ROP 1526. In at least one embodiment, read misses and urgent write-back requests are output by L2 cache 1521 to frame buffer interface 1525 for processing. In at least one embodiment, updates can also be sent to a frame buffer via frame buffer interface 1525 for processing. In at least one embodiment, frame buffer interface 1525 interfaces with one of memory units in parallel processor memory, such as memory units 1524A-1524N of FIG. 15A (e.g., within parallel processor memory 1522).

In at least one embodiment, ROP 1526 is a processing unit that performs raster operations such as stencil, z test, blending, etc. In at least one embodiment, ROP 1526 then outputs processed graphics data that is stored in graphics memory. In at least one embodiment, ROP 1526 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1526 can vary based on statistical characteristics of data to be compressed. For example, in at least one embodiment, delta color compression is performed on depth and color data on a per-tile basis.

In at least one embodiment, ROP 1526 is included within each processing cluster (e.g., cluster 1514A-1514N of FIG. 15A) instead of within partition unit 1520. In at least one embodiment, read and write requests for pixel data are transmitted over memory crossbar 1516 instead of pixel fragment data. In at least one embodiment, processed graphics data may be displayed on a display device, such as one of one or more display device(s) 1410 of FIG. 14, routed for further processing by processor(s) 1402, or routed for further processing by one of processing entities within parallel processor 1500 of FIG. 15A.

Embodiments presented herein can allow for a linear regulator with one or more features for improving the PSRR to identify and correct voltage noise within a circuit.

Figure 16:
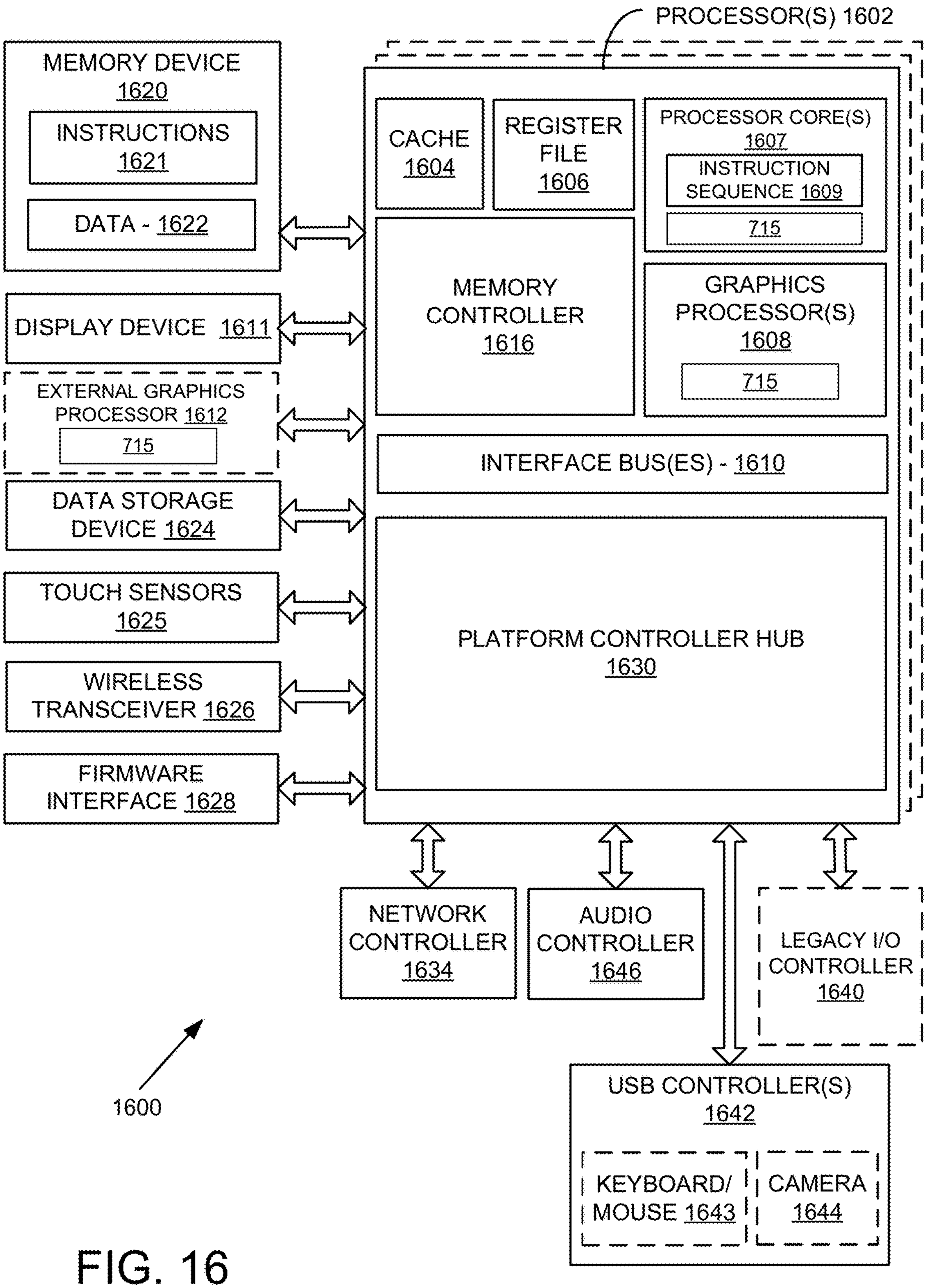
FIG. 16 illustrates at least portions of a graphics processor, according to one or more embodiments.

FIG. 16 is a block diagram of a processing system, according to at least one embodiment. In at least one embodiment, system 1600 includes one or more processor(s) 1602 and one or more graphics processor(s) 1608, and may be a single processor desktop system, a multiprocessor workstation system, or a server system having a large number of processor(s) 1602 or processor core(s) 1607. In at least one embodiment, system 1600 is a processing platform incorporated within a system-on-a-chip (SoC) integrated circuit for use in mobile, handheld, or embedded devices. In at least one embodiment, one or more graphics processor(s) 1608 include one or more graphics cores 1400.

In at least one embodiment, system 1600 can include, or be incorporated within a server-based gaming platform, a game console, including a game and media console, a mobile gaming console, a handheld game console, or an online game console. In at least one embodiment, system 1600 is a mobile phone, a smart phone, a tablet computing device or a mobile Internet device. In at least one embodiment, processing system 1600 can also include, couple with, or be integrated within a wearable device, such as a smart watch wearable device, a smart eyewear device, an augmented reality device, or a virtual reality device. In at least one embodiment, processing system 1600 is a television or set top box device having one or more processor(s) 1602 and a graphical interface generated by one or more graphics processor(s) 1608.

In at least one embodiment, one or more processor(s) 1602 each include one or more processor core(s) 1607 to process instructions which, when executed, perform operations for system and user software. In at least one embodiment, each of one or more processor core(s) 1607 is configured to process a specific instruction sequence 1609. In at least one embodiment, instruction sequence 1609 may facilitate Complex Instruction Set Computing (CISC), Reduced Instruction Set Computing (RISC), or computing via a Very Long Instruction Word (VLIW). In at least one embodiment, processor core(s) 1607 may each process a different instruction sequence 1609, which may include instructions to facilitate emulation of other instruction sequences. In at least one embodiment, processor core(s) 1607 may also include other processing devices, such a Digital Signal Processor (DSP).

In at least one embodiment, processor(s) 1602 includes a cache memory 1604. In at least one embodiment, processor(s) 1602 can have a single internal cache or multiple levels of internal cache. In at least one embodiment, cache memory is shared among various components of processor(s) 1602. In at least one embodiment, processor(s) 1602 also uses an external cache (e.g., a Level-3 (L3) cache or Last Level Cache (LLC)) (not shown), which may be shared among processor core(s) 1607 using known cache coherency techniques. In at least one embodiment, a register file 1606 is additionally included in processor(s) 1602, which may include different types of registers for storing different types of data (e.g., integer registers, floating point registers, status registers, and an instruction pointer register). In at least one embodiment, register file 1606 may include general-purpose registers or other registers.

In at least one embodiment, one or more processor(s) 1602 are coupled with one or more interface bus(es) 1610 to transmit communication signals such as address, data, or control signals between processor(s) 1602 and other components in system 1600. In at least one embodiment, interface bus(es) 1610 can be a processor bus, such as a version of a Direct Media Interface (DMI) bus. In at least one embodiment, interface bus(es) 1610 is not limited to a DMI bus, and may include one or more Peripheral Component Interconnect buses (e.g., PCI, PCI Express), memory busses, or other types of interface busses. In at least one embodiment processor(s) 1602 include an integrated memory controller 1616 and a platform controller hub 1630. In at least one embodiment, memory controller 1616 facilitates communication between a memory device and other components of system 1600, while platform controller hub (PCH) 1630 provides connections to I/O devices via a local I/O bus.

In at least one embodiment, a memory device 1620 can be a dynamic random access memory (DRAM) device, a static random access memory (SRAM) device, flash memory device, phase-change memory device, or some other memory device having suitable performance to serve as process memory. In at least one embodiment, memory device 1620 can operate as system memory for system 1600, to store data 1622 and instructions 1621 for use when one or more processor(s) 1602 executes an application or process. In at least one embodiment, memory controller 1616 also couples with an optional external graphics processor 1612, which may communicate with one or more graphics processor(s) 1608 in processor(s) 1602 to perform graphics and media operations. In at least one embodiment, a display device 1611 can connect to processor(s) 1602. In at least one embodiment, display device 1611 can include one or more of an internal display device, as in a mobile electronic device or a laptop device, or an external display device attached via a display interface (e.g., DisplayPort, etc.). In at least one embodiment, display device 1611 can include a head mounted display (HMD) such as a stereoscopic display device for use in virtual reality (VR) applications or augmented reality (AR) applications.

In at least one embodiment, platform controller hub 1630 enables peripherals to connect to memory device 1620 and processor(s) 1602 via a high-speed I/O bus. In at least one embodiment, I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). In at least one embodiment, data storage device 1624 can connect via a storage interface (e.g., SATA) or via a peripheral bus, such as a Peripheral Component Interconnect bus (e.g., PCI, PCI Express). In at least one embodiment, touch sensors 1625 can include touch screen sensors, pressure sensors, or fingerprint sensors. In at least one embodiment, wireless transceiver 1626 can be a Wi-Fi transceiver, a Bluetooth transceiver, or a mobile network transceiver such as a 3G, 4G, or Long Term Evolution (LTE) transceiver. In at least one embodiment, firmware interface 1628 enables communication with system firmware, and can be, for example, a unified extensible firmware interface (UEFI). In at least one embodiment, network controller 1634 can enable a network connection to a wired network. In at least one embodiment, a high-performance network controller (not shown) couples with interface bus(es) 1610. In at least one embodiment, audio controller 1646 is a multi-channel high definition audio controller. In at least one embodiment, system 1600 includes an optional legacy I/O controller 1640 for coupling legacy (e.g., Personal System 2 (PS/2)) devices to system 1600. In at least one embodiment, platform controller hub 1630 can also connect to one or more Universal Serial Bus (USB) controller(s) 1642 connect input devices, such as keyboard and mouse 1643 combinations, a camera 1644, or other USB input devices.

In at least one embodiment, an instance of memory controller 1616 and platform controller hub 1630 may be integrated into a discreet external graphics processor, such as external graphics processor 1612. In at least one embodiment, platform controller hub 1630 and/or memory controller 1616 may be external to one or more processor(s) 1602. For example, in at least one embodiment, system 1600 can include an external memory controller 1616 and platform controller hub 1630, which may be configured as a memory controller hub and peripheral controller hub within a system chipset that is in communication with processor(s) 1602.

Embodiments presented herein can allow for a linear regulator with one or more features for improving the PSRR to identify and correct voltage noise within a circuit.

Various embodiments can be described by the following clauses:

1. A computer-implemented method, comprising:
   - receiving, on a user device, one or more notifications;
   - determining, using an artificial intelligence model, contextual information for each of the one or more notifications;
   - determining a current status associated with a user of the user device;
   - determining a delivery method for each of the one or more notifications, different notifications able to have different determined delivery methods; and
   - causing at least a set of the plurality of notifications to be provided for presentation via the user device according to the determined delivery methods.
2. The computer-implemented method of clause 1, wherein the determined delivery method for an individual notification of the one or more notifications includes suppressing the notification, causing the notification to be presented immediately, delaying presentation of the notification for a later time, modifying content of the notification to be presented, setting or modifying an alert type, or categorizing the notification for grouped delivery with similar notifications.
3. The computer-implemented method of clause 1, the determining the contextual information further comprising:
   - extracting data comprising at least one of textual content, title information, sender information, or application-specific metadata, wherein the artificial intelligence model is trained to determine the contextual information based in part on the extracted data.

4. The computer-implemented method of clause 1, further comprising:
determining, using the artificial intelligence model, a second set of notifications to be suppressed from being presented via the user device;
holding the second set of notifications; and
causing the second set of notifications to be presented via the user device upon receiving a user indication.
5. The computer-implemented method of clause 1, the determining of the delivery method comprising:
analyzing text content of the one or more notifications using a large language model; and
classifying the one or more notifications based on one or more of an urgency, a degree of relevance based on status associated with the user, or personal preferences specified by the user.
6. The computer-implemented method of clause 1, wherein determining the status associated with the user is based on one or more of a location associated with the user, temporal information, a time of day, a day of the week, an operational status associated with the user device, and historical user interaction patterns with historical notifications.
7. The computer-implemented method of clause 1, further comprising dynamically adjusting the delivery method for the plurality of notifications in real-time based on changes in status associated with the user.
8. The computer-implemented method of clause 1, wherein the user is associated with other user devices, and wherein notifications for the other user devices are also delivered using the determined delivery method.
9. A processor comprising one or more circuits to:
receive, on a user device, one or more notifications;
determine, using an artificial intelligence model, contextual information for each of the one or more notifications;
determine a current status associated with a user of the user device;
determine a delivery method for each of the one or more notifications, different notifications able to have different determined delivery methods; and
cause at least a set of the plurality of notifications to be provided for presentation via the user device according to the determined delivery methods.
10. The processor of clause 9, wherein the determined delivery method for an individual notification of the one or more notifications includes suppressing the notification, causing the notification to be presented immediately, delaying presentation of the notification for a later time, modifying content of the notification to be presented, setting or modifying an alert type, or categorizing the notification for grouped delivery with similar notifications.
11. The processor of clause 9, the determining the contextual information further comprising:
extracting data comprising at least one of textual content, title information, sender information, or application-specific metadata, wherein the artificial intelligence model is trained to determine the contextual information based in part on the extracted data.
12. The processor of clause 9, further comprising:
determining, using the artificial intelligence model, a second set of notifications to be suppressed from being presented via the user device;
holding the second set of notifications; and
causing the second set of notifications to be presented via the user device upon receiving a user indication.
13. The processor of clause 9, the determining of the delivery method comprising:
analyzing text content of the one or more notifications using a large language model; and
classifying the one or more notifications based on one or more of an urgency, a degree of relevance based on status associated with the user, or personal preferences specified by the user.
14. The processor of clause 9, wherein determining the status associated with the user is based on one or more of a location associated with the user, temporal information, a time of day, a day of the week, an operational status associated with the user device, and historical user interaction patterns with historical notifications.
15. The processor of clause 9, further comprising dynamically adjusting the delivery method for the plurality of notifications in real-time based on changes in status associated with the user.
16. A system comprising:
one or more processors to determine, using a machine learning model, a delivery method for a received notification to be presented to a user, the delivery method determined based in part on contextual data information for the notification and a current status determined for a user.
17. The system of clause 16, wherein the delivery method includes at least one of suppressing the notification, delivering the notification immediately, delaying the notification for a later time, modifying a content of the notification, altering an alert type, or categorizing the notification for grouped delivery with similar notifications.
18. The system of clause 16, the determining the contextual information further comprising:
extracting data comprising at least one of textual content, title information, sender information, or application-specific metadata, wherein the artificial intelligence model is trained to determine the contextual information based in part on the extracted data.
19. The system of clause 16, wherein the one or more processors are further to:
determine, using the artificial intelligence model, a second set of notifications to be suppressed from being displayed to the user device;
hold the second set of notifications from being displayed to the user device; and
display the second set of notifications upon receiving a user indication.
20. The system of clause 16, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;

a system for performing hardware testing using simulation;

a system for synthetic data generation;

a system for performing generative AI operations using a large language model (LLM), a collaborative content creation platform for 3D assets; or a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable computer system 1000 to perform various functions in accordance with at least one embodiment. In at least one embodiment, main memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous FIGS. 1-6 are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous FIGS. 1-6 are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1014, although such shared memory may incur performance penalties relative to use of local memory and registers resident to a PPU 1014. In at least one embodiment, operation of PPUs 1014 is synchronized through use of a command such as _syncthreads( ), wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oncAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oncAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as one VPL, is a library that is utilized for accelerating video processing in one or more applications. In at least one embodiment, one VPL implements various video decoding, encoding, and processing functions. In at least one embodiment, oneVPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a set of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processor 1310, graphics processor 1340, graphics core 1400, parallel processor 1500, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "set" unless otherwise noted or contradicted by context, is to be construed as a nonempty collection comprising one or more members. Further, unless otherwise noted or contradicted by context, term "set" of a corresponding set does not necessarily denote a proper set of corresponding set, but set and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty set of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different sets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

determining, using a machine learning model, contextual information for a first set of notifications and a second set of notifications corresponding to a user device;

determining a current status associated with a user of the user device;

dynamically determining a delivery method from a plurality of different delivery methods for each of the first set of notifications and the second set of notifications based at least on the current status and real-time changes in the current status; and causing at least the first set of notifications to be provided for presentation via the user device according to the determined delivery method, and the second set of notifications to be suppressed from being presented to the user device according to the determined delivery method until a user indication is received.

2. The computer-implemented method of claim 1, wherein the determined delivery method for an individual notification of the one or more notifications includes at least one of: suppressing the notification, causing the notification to be presented immediately, delaying presentation of the notification for a later time, modifying content of the notification to be presented, modifying a duration of the presentation of the notification, determining an alert type, modifying an alert type, or categorizing the notification for grouped delivery with similar notifications.

3. The computer-implemented method of claim 1, the determining the contextual information further comprising:

extracting data comprising at least one of: textual content, title information, sender information, or application-specific metadata, wherein the machine learning model comprises a neural network updated to determine the contextual information based in part on the extracted data.

4. The computer-implemented method of claim 1, the determining of the delivery method comprising:

analyzing content of the one or more notifications using at least one of a large language model (LLM) or a vision language model (VLM); and classifying the one or more notifications based on one or more of: an urgency, a degree of relevance based on status associated with the user, or one or more personal preferences specified by the user.

5. The computer-implemented method of claim 1, wherein determining the status associated with the user is based on one or more of: a location associated with the user, temporal information, an operational status associated with the user device, or one or more historical user interaction patterns with historical notifications.

6. The computer-implemented method of claim 1, wherein the user is associated with one or more additional user devices, and wherein at least the set of one or more notifications for the one or more additional user devices are also delivered using the determined delivery method.

7. A processor comprising one or more circuits to:

determine, using a machine learning model, contextual information for a first set of notifications and a second set of notifications corresponding to a user device;

determine a current status associated with a user of the user device;

dynamically determine a delivery method from a plurality of different delivery methods for each of the first set of notifications and the second set of notifications based at least on the current status and real-time changes in the current status; and cause at least the first set of notifications to be provided for presentation via the user device according to the determined delivery methods, and the second set of notifications to be suppressed from being presented to the user device according to the determined delivery method until a user indication is received.

8. The processor of claim 7, wherein the determined delivery method for an individual notification of the one or more notifications includes at least one of:

suppressing the notification, causing the notification to be presented immediately, delaying presentation of the notification for a later time, modifying content of the notification to be presented, modifying a duration of the presentation of the notification, determining an alert type, modifying an alert type, or categorizing the notification for grouped delivery with similar notifications.

9. The processor of claim 7, the determining the contextual information further comprising: extracting data comprising at least one of: textual content, title information, sender information, or application-specific metadata, wherein the machine learning model is a neural network updated to determine the contextual information based in part on the extracted data.

10. The processor of claim 7, the determining of the delivery method comprising:

analyzing content of the one or more notifications using at least one of a large language model (LLM) or a vision language model (VLM); and classifying the one or more notifications based on one or more of: an urgency, a degree of relevance based on status associated with the user, or personal preferences specified by the user.

11. The processor of claim 7, wherein determining the status associated with the user is based on one or more of: a location associated with the user, temporal information, an operational status associated with the user device, or one or more historical user interaction patterns with historical notifications.

12. A system comprising:

one or more processors to dynamically determine, using a machine learning model, a delivery method from a plurality of delivery methods for a first set of notifications and a second set of notifications to be presented to a user, the delivery method being determined based in part on contextual data information corresponding to the notification, a current status determined for a user, and real-time changes in the current status, wherein the second set of notifications is to be suppressed from being presented to the user according to the determined delivery method until a user indication is received.

13. The system of claim 12, wherein the delivery method includes at least one of: suppressing the notification, delivering the notification immediately, delaying the notification for a later time, modifying a content of the notification, modifying a duration of the presentation of the notification, altering an alert type, or categorizing the notification for grouped delivery with similar notifications.

14. The system of claim 12, wherein the one or more processors are further to determine the contextual information by:

Extracting data comprising at least one of: textual content, title information, sender information, or application-specific metadata, wherein the machine learning model is updated to determine the contextual information based in part on the extracted data.

15. The system of claim 12, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM);

a system for performing generative AI operations using a vision language model (VLM);

a collaborative content creation platform for 3D assets; or a system implemented at least partially using cloud computing resources.

* * * * *